US011347279B2

(12) United States Patent
Schnell et al.

(10) Patent No.: US 11,347,279 B2
(45) Date of Patent: May 31, 2022

(54) ADAPTABLE GRAPHICS BOARD WITH A RECONFIGURABLE I/O MODULE BOARD FOR USE IN INFORMATION HANDLING SYSTEMS

(71) Applicant: Dell Products, LP, Round Rock, TX (US)

(72) Inventors: Arnold Thomas Schnell, Hutto, TX (US); Ivan Guerra, Round Rock, TX (US); Ahsan Habib, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/930,439

(22) Filed: May 13, 2020

(65) Prior Publication Data

US 2020/0272211 A1 Aug. 27, 2020

Related U.S. Application Data

(63) Continuation of application No. 15/950,817, filed on Apr. 11, 2018, now Pat. No. 10,649,505.

(51) Int. Cl.
*G06F 1/18* (2006.01)
*G06F 1/16* (2006.01)
*G06T 1/20* (2006.01)

(52) U.S. Cl.
CPC ............ *G06F 1/185* (2013.01); *G06F 1/1633* (2013.01); *G06T 1/20* (2013.01)

(58) Field of Classification Search
CPC ....................................................... H05K 7/10
See application file for complete search history.

(56) References Cited

U.S. PATENT DOCUMENTS 5,263,868 A 11/1993 Renn
5,336,095 A 8/1994 Walburn
(Continued)

*Primary Examiner* — Jerry Wu
(74) *Attorney, Agent, or Firm* — Prol Intellectual Property Law, PLLC; H. Kenneth Prol

(57) ABSTRACT

A system and method of implementing an adaptable graphics board comprising the adaptable graphics board including a graphics processor, graphics memory, and a reconfigurable I/O module interface are having a plurality of electrical contacts, a dual compression connector having a first array of compressible electrical spring contacts on a first side and a second array of compressible electrical spring contacts on a second side operatively coupled to the first side via a dual compression connector printed circuit board layer, the first side of the dual compression connector operatively coupled to the reconfigurable I/O module interface of the adaptable graphics board, and a reconfigurable I/O module board having external display data ports disposed along an edge, wherein the reconfigurable I/O module board is operatively coupled to the adaptable graphics board via the second side of the dual compression connector. The dual compression connector is oriented between the adaptable graphics board and the reconfigurable I/O module board in a first orientation selected from a plurality of available orientations to provide I/O connectivity between the graphics processor and the external display data ports aligned along a first edge of the adaptable graphics board.

8 Claims, 13 Drawing Sheets

(56) References Cited

U.S. PATENT DOCUMENTS

| | | |
|---|---|---|
| 5,456,608 A | 10/1995 | Rogers |
| 5,764,934 A | 6/1998 | Fisch |
| 5,971,806 A | 10/1999 | Evans |
| 6,042,412 A * | 3/2000 | Murr ............... H05K 7/1069 439/331 |
| 6,074,220 A | 6/2000 | Roberts |
| 6,351,681 B1 | 2/2002 | Chih |
| 6,797,998 B2 | 9/2004 | Dewey |
| 7,442,204 B2 | 1/2008 | Schwammenthal |
| 7,710,741 B1 | 5/2010 | Kelleher |
| 9,974,206 B2 | 5/2018 | Degner |
| 2005/0270298 A1 | 12/2005 | Thieret |
| 2009/0060455 A1* | 3/2009 | Pan ................ H04N 21/4852 386/353 |
| 2010/0307798 A1 | 12/2010 | Izadian |
| 2013/0279112 A1 | 10/2013 | Kim |

* cited by examiner

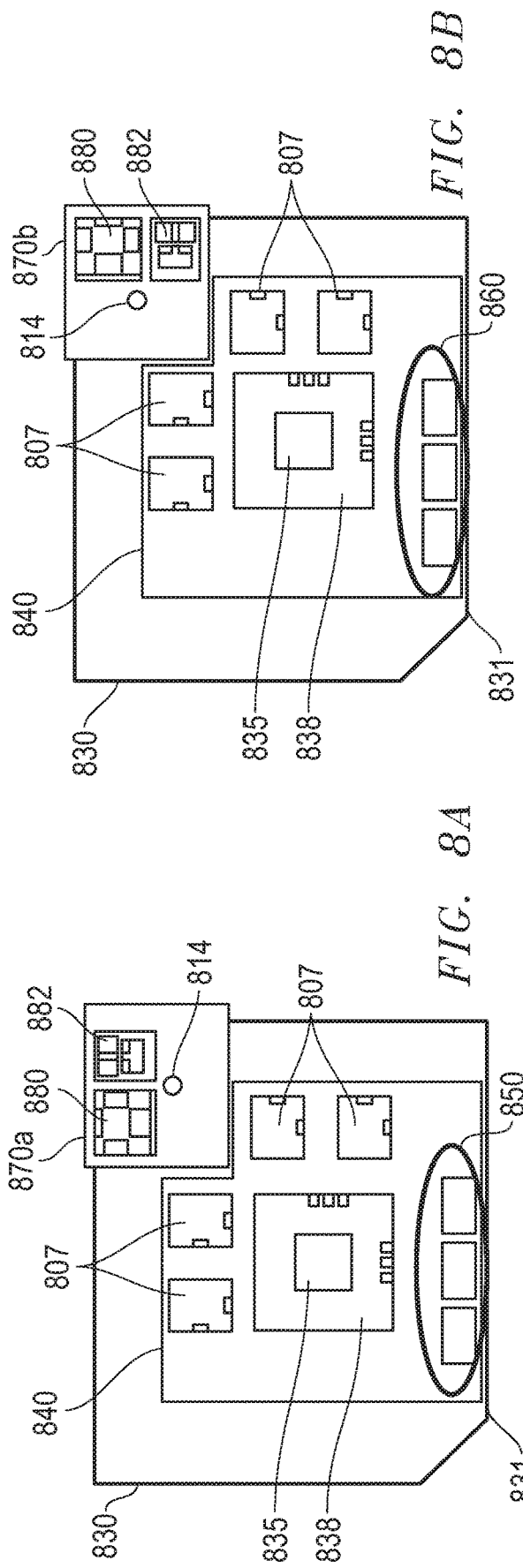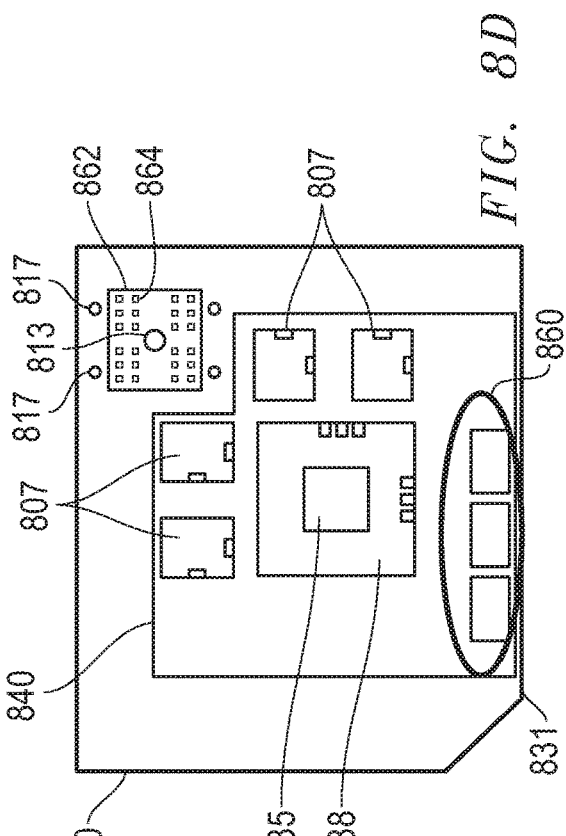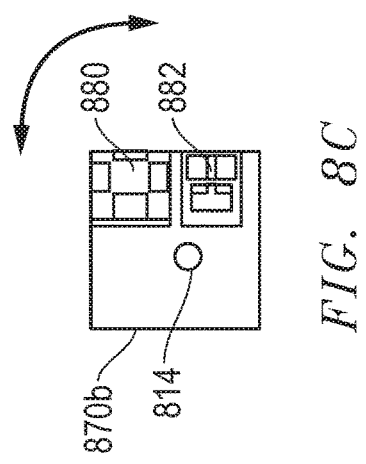

ADAPTABLE GRAPHICS BOARD WITH A RECONFIGURABLE I/O MODULE BOARD FOR USE IN INFORMATION HANDLING SYSTEMS

This application is a continuation of prior application Ser. No. 15/950,817 entitled "AN ADAPTABLE GRAPHICS BOARD WITH A RECONFIGURABLE I/O MODULE BOARD FOR USE IN INFORMATION HANDLING SYSTEMS," filed on Apr. 11, 2018, which is assigned to the current assignee hereof and is incorporated herein by reference in its entirety.

FIELD OF THE DISCLOSURE

The present disclosure generally relates to a method and apparatus for connector systems for board transitions among components of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Further, powerful graphics system may be desirable for use with current applications even for information handling systems have limited internal space to house components or for information handling systems requiring thin profiles such as mobile information handling systems. Components within information handling systems performing various functions may need to be designed for implementation in many form factors requiring variation to maintain space efficiency. The components within information handling systems may be more cost efficient when designed to be conformable to available characteristics of several information handling system models to minimize costs of re-designing entire components or component layouts between models and further decrease design complexities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 8A is a top view of an adaptable graphics board having a reconfigurable I/O module board operatively coupled in a first orientation according to an embodiment of the present disclosure;

FIG. 8B is a top view of an adaptable graphics board having a reconfigurable I/O module board operatively coupled in a second orientation according to another embodiment of the present disclosure;

FIG. 8C is a top view of a reconfigurable I/O module board according to an embodiment of the present disclosure;

FIG. 8D is a top view of an adaptable graphics board having a reconfigurable I/O module interface according to an embodiment of the present disclosure;

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Figure 1:
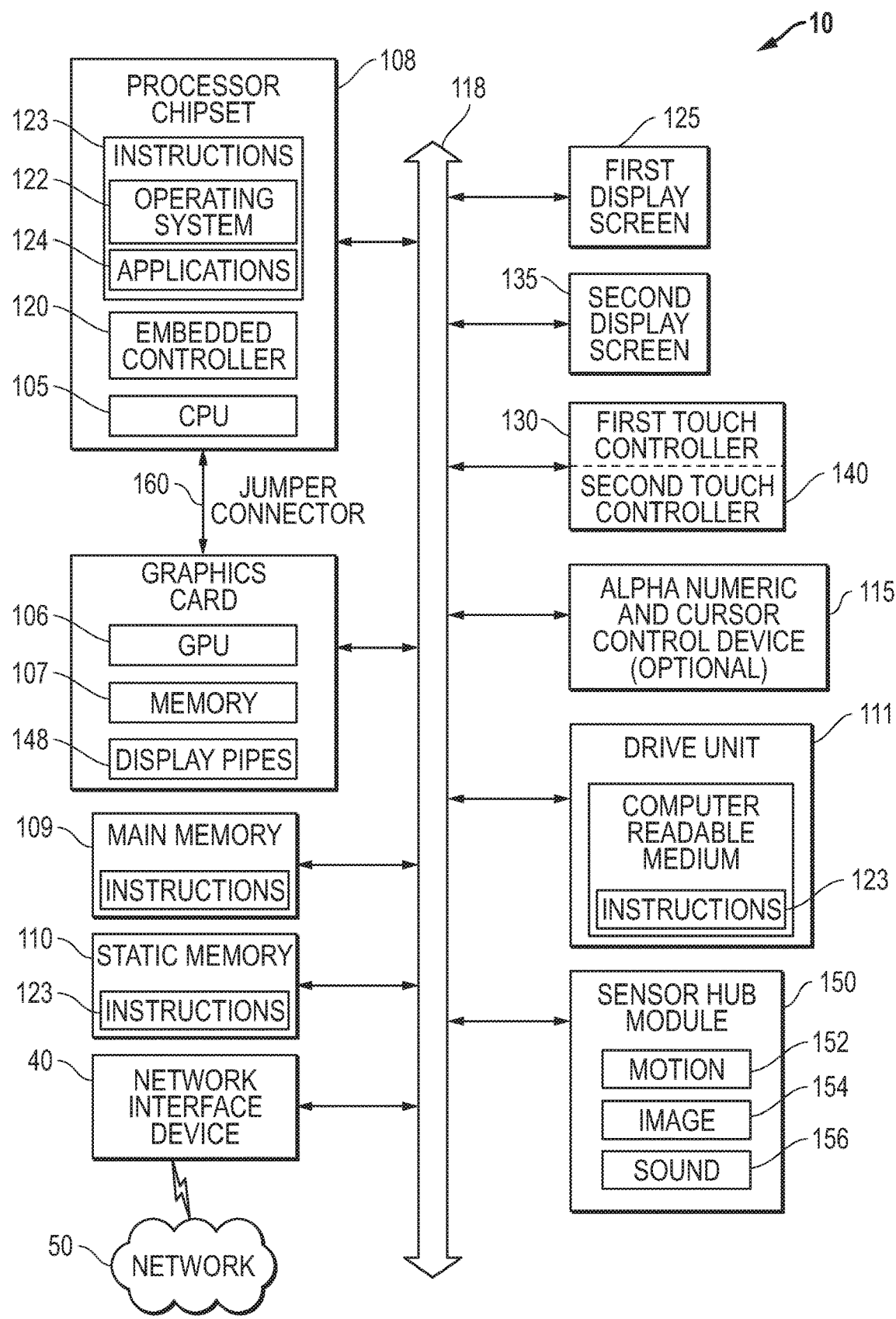
FIG. 1 is a block diagram illustrating an information handling system according to an embodiment of the present disclosure.

FIG. 1 shows an information handling system 10 capable of administering each of the specific embodiments of the present disclosure. The information handling system 10 can represent information handling systems with motherboard and graphics board arrangements shown in FIGS. 2-4 and implementation of the embodiments described in FIG. 5 and FIG. 6. Information handling system 10 may represent an information handling system such as a mobile information handling system with enhanced graphics processing capabilities. A mobile information handling system may execute instructions via a processor for a plurality of application programs and operating systems as understood. Information handling system 10 may also represent a networked server or other system. The information handling system 10 may include a processor such as a central processing unit (CPU) 105, a graphics processing unit (GPU) 106, or both. Moreover, the information handling system 10 can include a main memory 109 and a static memory 110 that can communicate with each other via a bus 118.

As shown, the information handling system 10 may further include a video display 125 and in some embodiments a second display screen 135 or more display screens. Display screens 125 or 135 may be of a variety of display devices, such as a liquid crystal display (LCD), an organic light emitting diode (OLED), a flat panel display, a solid state display, or a cathode ray tube (CRT). Display 125 or 135 may include one or more touch screen display module and touch screen controllers 130 and 140 for receiving user inputs to the information handling system 10. In the case of information handling systems with flat panel display systems including LCD or OLED displays, it is desirable to minimize a thickness of the information handling system while maximizing the power of the graphics display system to accommodate, for example, a large size of the display(s) on the surface of the information handling system. In some cases, mobile information handling systems may have very limited thickness in a chassis to accommodate the display, motherboard, and a separate graphics board for enhanced graphics processing power or performance. Thus, the thickness or "Z" dimension space may be very limited for internal components and may particularly be limited according to current systems for linking a motherboard and distinct graphics board. Additionally, multiple levels for a CPU 105 and GPU 106 may require a complex system of bends and angles when a shared heat pipe system is employed or may require two separate heat pipes for the CPU 105 and GPU 106. A heat pipe with complex bends may be less efficient and costlier to manufacture. Multiple heat pipes may increase costs of an information handling system as well. Current connectors for electrical communication connections within the chipset from CPU 105 and GPU 106 may include MxM connectors which may require a right angle connection or otherwise elevated connection and place a motherboard and graphics board at different levels which may contribute to an overall thickness of an information handling system.

According to embodiments of the disclosure, a flexible compression jumper connector 160 with a plurality of compression jumper pads having compressible communication contacts for operatively coupling to connector pad interface areas on the motherboard and graphics boards respectively. The flexible compression jumper connector 160 includes a flexible jumper trace array cable, which may be a ribbon cable connector or array of electrical traces, and which provides for an adjustable transition between levels of the compression jumper pads to link the mother board and graphics boards electrically for communication. In some embodiments, the compressible communication contacts may include an array of compressible electrical spring contacts on each compression jumper pad. In yet other embodiments, the compressible communication contacts, such as an array of compressible electrical spring contacts, may be mounted on the motherboard or graphics board facing away from the motherboard or graphics board. The compression jumper pads a flexible compression jumper connector 160 in such an embodiment have electrical contacts that compress the compressible communication contacts mounted to the motherboard and graphics board at connector pad interface areas. The compressible communication contacts in such an embodiment may be soldered to the motherboard and graphics board respectively in some embodiments. Other mounting systems may be used to establish electrical conductivity for communications via the board connector pad interface areas and between the CPU and GPU mounted on the motherboard and graphics boards respectively in other embodiments as well.

The flexible compression jumper connector 160 includes a flexible jumper trace array cable, which may be a ribbon cable connector or array of electrical traces, and which provides for an adjustable transition between levels of the compression jumper pads to link the mother board and graphics boards electrically for communication. In some embodiments, the compressible communication contacts may include an array of compressible electrical spring contacts on each compression jumper pad. In yet other embodiments, the compressible communication contacts, such as an array of compressible electrical spring contacts, may be mounted on the motherboard or graphics board facing away from the motherboard or graphics board. The compression jumper pads a flexible compression jumper connector 160 in such an embodiment have electrical contacts that compress the compressible communication contacts mounted to the motherboard and graphics board at connector pad interface areas.

Due to the material metal or metal alloy used with a flexible compression jumper connector 160 having compression jumper pads with compressible communication contacts for operatively coupling to connector pad interface areas on the motherboard and graphics boards respectively, some issues may arise during mechanical contact and compression of the compressible communication contacts with the corresponding PCB electrical contacts of the connector pad interface areas. PCB boards are frequently required to be finished with a coating layer to avoid tarnish, damage from thermal shock or humidity of the PCB including copper exposed areas such as electrical contacts and the like. The finish use must be solderable such that the finish is eliminated by flux during the soldering process while maintaining protection of copper from oxidation when not soldered. An example finish includes Organic Solderability Preservatives (OSP) as an anti-tarnish layer applied to PCBs.

A compression electrical connection however may not be compatible with an OSP finished PCB board since not flux or solder is applied to create the electrical connection. Further, the OSP may cause possible chemical reaction to the metal or metal allow used with the compressible communication contacts of the flexible compression jumper connector 160. As a solution, localized plating of the electrical contacts in the connector pad interfaces may be conducted with a neutral metal interface that provides sufficient conductivity. However, localized plating at the electrical contacts of the connector pad interfaces may be an expensive or inefficient process. Often the plating includes a gold component, gold alloy, or even a silver alloy such as electroless nickel immersion gold (ENIG), gold flash, or hard gold plating. Thus, additional cost is incurred if the plating involves a greater area with masking and the like than the localized connector pad interfaces. A localized plating interposer is developed for a transition between the PCB electrical connectors in the connector pad interface areas of the motherboard and graphics board which may have an array of plated electrical connectors on one side. The localized plating interposer may be inserted between the connector pad interface to which it is soldered on the motherboard or graphics board and the compression pads of the flexible compression jumper connector 160

In various embodiments, the flexible compression jumper connector 160 allows for adjacent placement of motherboards along the graphics boards without substantial additional height or "Z" dimension occupancy of those boards to maintain a thin information handling system profile. Further, the flexible compression jumper connector 160 may accommodate channels or data lanes for various digital display data communication standards including bus architectures such as PCIe or display data interface standards such as DisplayPort (DP), or eDP. Such standards may be used for communications between the CPU 105 and GPU 105 mounted on separate cards. Additional lanes or channels of PCIe, DP, or other standard digital display data communications may be achieved with utilization of a plurality of flexible compression jumper connectors 160 between the motherboard and graphics board while maintaining the advantages of minimizing thickness and offset between levels of the CPU 105 and GPU 106.

Additionally, the information handling system 10 may include an input device 115, such as a keyboard, and a cursor control device, such as a mouse or touchpad or similar peripheral input device. The information handling system may include a power source such as battery or an A/C power source (not shown). The information handling system 10 can also include a disk drive unit 111, and a signal generation device such as a speaker or remote control or other device (not shown). The information handling system 10 can include a network interface device 40 such as a wireless adapter or similar wireless radio system to accommodate a variety of wireless communication protocols. The information handling system 10 can also represent a server device whose resources can be shared by multiple client devices, or it can represent an individual client device, such as a desktop personal computer, a laptop computer, a tablet computer, a mobile smartphone, or a wearable computing device.

The information handling system 10 can include a set of instructions 123 that can be executed to cause the computer system to perform any one or more methods or computer-based functions. Various software modules comprising application instructions 124 may be coordinated by an operating system (OS) 122 and via an application programming interface (API). An example operating system may include Windows®, Android®, and other OS types known in the art. Example APIs may include Win 32, Core Java API, or Android APIs. In a further example, processor 105 may conduct processing of sets of instructions in software, firmware, hardware or any combination of the same to achieve functions understood to be performed by the information handling system 10 according to disclosures herein. Further one or more embedded controllers 120 may also be included in the chipset, on the motherboard, or in the graphics board to provide for additional processing or execution of instructions in addition to processing conducted by the CPU 105 or GPU 106 as understood in some embodiments. The computer system 10 may operate as a standalone device or may be connected such as using a network, to other computer systems or peripheral devices.

In a networked deployment, the information handling system 10 may operate in the capacity of a server or as a client user computer in a server-client user network environment, or as a peer computer system in a peer-to-peer (or distributed) network environment. The information handling system 10 can also be implemented as or incorporated into various devices, such as a personal computer (PC), a tablet PC, a set-top box (STB), a PDA, a mobile information handling system, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 10 can be implemented using electronic devices that provide voice, video, or data communication. Further, while a single information handling system 10 is illustrated, the term "system" shall also be taken to include any collection of systems or subsystems that individually or jointly execute a set, or multiple sets, of instructions to perform one or more computer functions.

The static memory 110 or disk drive unit 111 may include a computer-readable medium in which one or more sets of instructions 123 such as software can be embedded or stored. Similarly, main memory 109 and static memory 110 may also contain computer-readable medium for storage of one or more sets of instructions, parameters, or profiles 123. The disk drive unit 111 and static memory 110 also contains space for data storage. Further, the instructions 123 may embody one or more of the methods or logic for applications, such as 124, that operate on the information handling system to display graphical content as described herein. For example, instructions relating to the various software algorithms and data may be stored here. The instructions, parameters, and profiles 123 may reside completely, or at least partially, within the main memory 109, the static memory 110, and/or within the disk drive 111 during execution by the processor 105 of information handling system 10. As explained, some or all the software, firmware or hardware instructions may be executed locally or remotely. The main memory 109 and the processor 105 also may include computer-readable media.

The network interface device 40, such as a wireless adapter, can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 40 may include one or more radio frequency subsystems with transmitter/receiver circuitry, wireless controller circuitry, amplifiers and other circuitry for wireless communications. Each radiofrequency subsystem may communicate with one or more wireless technology protocols. The wireless adapter 40 may also include antenna system which may be tunable antenna systems in some embodiments.

The wireless adapter 40 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 40 can represent an add-in card, wireless network interface module that is integrated with a main board of the information handling system or integrated with another wireless network interface capability, or any combination thereof. In an embodiment the wireless adapter 40 may include one or more radio frequency subsystems including transmitters and wireless controllers for connecting via a multitude of wireless links. The radio frequency subsystems include wireless controllers to manage authentication, connectivity, communications, power levels for transmission, buffering, error correction, baseband processing, and other functions of the wireless adapter 40. The wireless adapter 40 may also connect to the external network via a WPAN, WLAN, WWAN or similar wireless switched Ethernet connection. The wireless data communication standards set forth protocols for communications and routing via access points, as well as protocols for a variety of other operations.

In some embodiments, dedicated hardware implementations such as application specific integrated circuits, programmable logic arrays and other hardware devices can be constructed to implement one or more of the applications operating on the information handling system 10. Applications that may include the apparatus and systems of various embodiments can broadly include a variety of electronic and computer systems. One or more embodiments may implement functions using two or more specific interconnected hardware modules or devices with related control and data signals that can be communicated between and through the modules, or as portions of an application-specific integrated circuit.

In accordance with various embodiments of the present disclosure, the applications executed by the information handling system may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 123 or receives and executes instructions, parameters, and profiles 123 responsive to a propagated signal; so that a device connected to a network 50 can communicate voice, video or data over the network 50. Further, the instructions 123 may be transmitted or received over the network 50 via the network interface device or wireless adapter 40.

In other aspects, computer-readable medium that includes instructions, parameters, and profiles 123 or receives and executes instructions, parameters, and profiles 123, such as from applications 124 or OS 122, responsive to a propagated signal may communicate digital display data or instructions via flexible compression jumper connector 160. Digital display data may eventually be propagated to the graphic board and GPU 106 for processing via the GPU 106, graphics memory 107 and distributed via display pipes 148 to a first display screen 125 in some embodiments. In other embodiments, a second display screen 135 may also be deployed.

Information handling system 10 includes one or more application programs 124, and Basic Input/Output System and firmware (BIOS/FW) code. BIOS/FW code functions to initialize information handling system 10 on power up, to launch an operating system 122, and to manage input and output interactions between the operating system and the other elements of information handling system 10. In a particular embodiment, BIOS/FW code resides in memory 109, and includes machine-executable code that is executed by processor 105 to perform various functions of information handling system 10. In another embodiment, application programs 124 as a part of various instructions 123 and BIOS/FW code reside in another storage medium of information handling system 10. For example, application programs and BIOS/FW code can reside in drive 111, in a ROM (not illustrated) associated with information handling system 10, in an option-ROM (not illustrated) associated with various devices of information handling system 10, in storage system 109, static memory 110, in a storage system (not illustrated) associated with network channel of a wireless adapter 40, in another storage medium of information handling system 10, in display memory 107 in parts or in any combination thereof. Application programs 124 and BIOS/FW code can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2A:
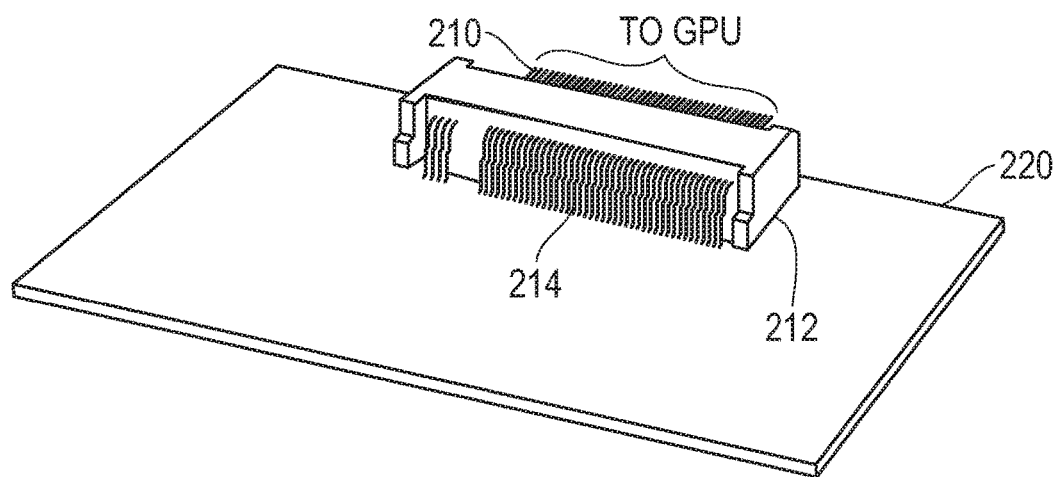
FIG. 2A is a perspective view of an MxM graphics board connector for mobile information handling system.

FIG. 2A illustrates a perspective view of M×M connector 212 on a motherboard 220 according to examples of connector systems used in the prior art. For example, M×M connector 212 is mounted to a motherboard 220 and includes a plurality of connector wires 214 providing for a 90 degree angle turn of communication connector array socket 210. Communication connector array socket 210 shows an array of wires for illustrative purposes to show the parallel connectivity between the motherboard 220 and where a graphics board would be mounted in socket 210. The M×M connector socket 210 may be connected to a graphics board arranged parallel to mother board 220. The graphics board (not shown) is connected via connector socket 210 causing a substantial offset between the motherboard 220 and the graphics board such that additional thickness may be required within an information handling system chassis.

Figure 2B:
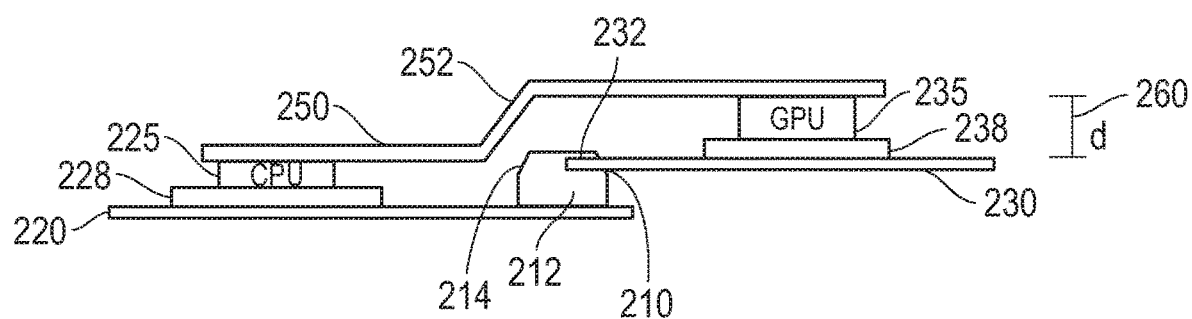
FIG. 2B is a graphic diagram showing a cross-section view of an offset between component boards with an MxM graphics board connector.

FIG. 2B shows a cross section of an M×M connector 212 and the offset between a mother board 220 and a graphic board 230. The M×M connector has a connector socket 210 in which a graphics board 230 may fit including an array of electrical contacts 232 at the edge of the graphics board 230. The edge mounted electrical contacts 232 fit into the socket 210 of the M×M connector 212. The M×M connector 212 provides for a 90-degree angle turn for communication via connectors 214 which are mounted to motherboard 220. As shown, M×M connectors such as 212 create elevation between the motherboard 220 and graphics board 230.

The motherboard 220 may include a CPU 225 and socket 228 mounted thereon providing for processing functionality of the motherboard. The CPU 225 and socket system 228 provide a specific height level to the motherboard 220. Similarly, graphics board 230 may include a GPU 235 and socket system 238 for mounting on the graphics board 230. An offset of "d" 260 is shown to occur between the top of the GPU 235 on the graphics board 230 and the top of the CPU 225 on the motherboard due to the M×M connector 212. In the event a shared heat pipe 250 is to be utilized for both the CPU 225 and GPU 235, a bend 252 or other complexity to the heat pipe must be employed to accommodate the offset "d" 260 between the top of the CPU 225 and the top of the GPU 235. Heat pipe 250 must contact the top of the CPU 225 and the top of the GPU 235 to draw off heat generated during processing and maintain cooler operating temperatures without which the processing systems may operate less effectively or may fail.

Figure 3A:
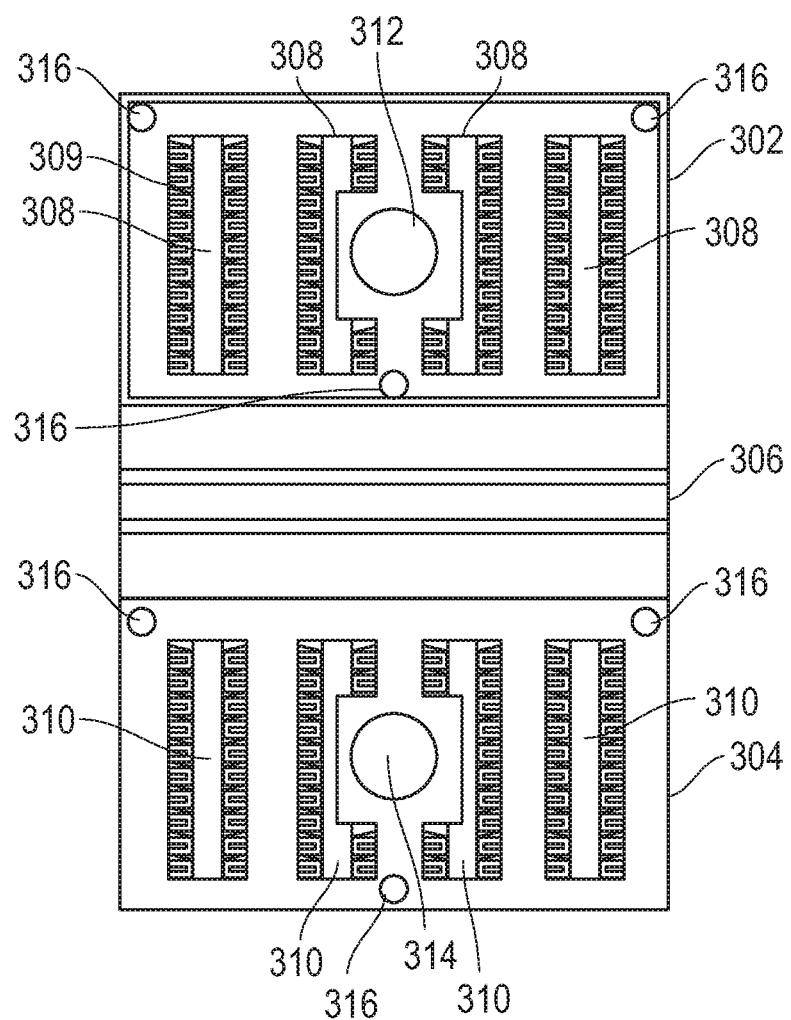
FIG. 3A is graphic diagram of a flexible compression jumper connector according to an embodiment of the present disclosure.

FIG. 3A shows a bottom view of a flexible compression jumper connector according to an embodiment of the present disclosure. The flexible compression jumper connector shown in FIG. 3A includes a first compression jumper pad 302 and a second compression jumper pad 304 for operative coupling to either a motherboard or a graphics board. Between the first compression jumper pad 302 and the second compression jumper pad 304 is an adjustable jumper trace array cable 306 connecting a first array of compressible communication contacts 308 of the first compression jumper pad 302 to a second array of compressible communication contacts 310 of the second compression jumper pad 304. The adjustable jumper trace array cable 306 may be a ribbon cable with a plurality of electrical communication wires or may be a rigid but bendable ribbon of metallic traces or communication connections between the first compression jumper pad 302 and the second compression jumper pad 304. The adjustable jumper trace array cable 306 may have a bend zone for a curve or angle that may be adjusted to alter the height or vertical orientation of the compression jumper pads 302 and 304 with respect to one another. This angle, curve, or other bend adjustment of the compression jumper pads 302 and 304 with respect to one another provides for alignment of an operatively connected motherboard and graphics board when adjacent to one another. The angle, curve, or other bend adjustment to the flexible jumper trace array cable 306 may accommodate an offset in height of the motherboard and graphics board that is less than the offset required of previous connectors such as the M×M connector. The flexible jumper trace array cable 306 adjustable transition may permit alignment of the CPU with respect to the GPU in terms of height within the information handling system housing above the chassis. However, the flexible compression jumper connector provides for generally adjacent orientation of the motherboard and graphics board to reduce overall thickness of these components within information handling systems.

The compression jumper pad 302 may include an array of compressible communication contacts 308 which, in some embodiments, may include an array of compressible electrical spring contacts. Each compressible electrical spring contact, such as shown at 309, may represent a channel or lane of a communication protocol or may include several lanes or channels depending on compression or multiplexing of those data streams. Similarly, compression jumper pad 304 may include an array of compressible communication contacts 310 which may include an array of compressible electrical spring contacts as well. As the compressible electrical spring contact is engaged and compressed via a clamping mechanism to a connector pad interface area on the motherboard or graphics board, the spring contact 309 engages with a corresponding electrical contact aligned to match up in the connector pad interface area of the motherboard or graphics board. In an example embodiment, the motherboard may have an electrical contact in its connector pad interface area that corresponds to one or more of the compressible electrical spring contacts 308 of the compression jumper pad 302. In some example embodiments, each compressible electrical spring contact 308 corresponds to an electrical contact in an array of electrical contacts of the connector pad interface area of the motherboard. Similarly, a graphics board may have one or more electrical contacts in its connector pad interface area that corresponds to one or more compressible electrical springs 310 of compression jumper pad 304 in some embodiments. In some embodiments, each compressible electrical spring contact of array 310 may have a corresponding electrical contact in the connector pad interface area of the graphics card with which it is matched.

Additional detail of the compression jumper pads 302 and 304 are shown as well. Each compression jumper pad 302 and 304 has a hole, 312 and 314 respectively, to accommodate a clamping mechanism in some embodiments. In at least one embodiment, hole 312 may accept a compression screw (not shown) through the compression jumper pad 302. A compression screw may be used with a compression screw receiver, such as a nut, mounted on or in the motherboard as a clamping mechanism in some embodiments to compress the compression jumper pad 302 to the motherboard. A compression screw may compress the compressible electrical springs 308 to the electrical contacts in the connector pad interface area of the motherboard.

In a similar embodiment, hole 314 may accept a compression screw through the compression jumper pad 304 which may be used with a compression screw receiver, such as a nut, mounted on or in the graphics board to compress the compression jumper pad 304 to the graphics board. A compression screw (now shown) may compress the compressible electrical springs 310 to the electrical contacts in the connector pad interface area of the graphics board.

In some embodiments, a compressible electrical spring contacts 308 and 310 may be made of a variety of metals or metal alloys. In some aspects, electrical conductivity, rigidity, and shape memory are important qualities as well as enough flexibility to reduce breakage of individual electrical spring contacts in arrays 308 or 310 during installation or operation. In one example embodiment, arrays of compressible electrical spring contacts 308 and 310 may be made of beryllium copper alloy which may satisfy several of these qualities. Use of beryllium copper for the compressible electrical spring contacts 308 and 310 may require a plating on the connector pad interface areas of the motherboard or graphics board to ensure optimal electrical contact between the beryllium copper compressible electrical spring contacts 308 and 310 and the plurality of electrical contacts in the connector pad interface areas. Moreover, surface plating on PCB electrical contacts in connector pad interface areas may also prevent chemical interaction between beryllium copper and the OSP finish on the PCB metal traces used for the electrical contacts. Masking may be used to provide for a coating, or plating techniques may apply a layer of electrically conductive material on the contact portions of the connector pad interface areas of the motherboard or graphics board in some embodiments. In an example embodiment, a plating using a highly conductive gold alloy or material including conductive gold may be used. For example, in one embodiment, ENIG may be used as a surface plating for the printed circuit boards of the motherboard or graphics board. In particular, ENIG may be used as surface plating on the connector pad interface areas of the motherboard or graphics board PCBs with the plurality of electrical contacts serving as PCIe communication wires or DP digital image data communication lanes from the CPU to the GPU. Other surface finishes may be used to enhance metallic compatibility or conductivity between the compressible electrical spring contacts 308 and 310 and the electrical contacts of the PCBs for the connector pad interface areas of the motherboard and graphics board. For example, direct gold plating, plating over nickel, HASL, immersion silver (IAg), and other PCB plating materials may be used in some embodiments as well.

In another aspect, compression jumper pads 302 and 304 may have alignment guides 316, such as alignment posts, guide bars, guide grooves or the like that may be used to line up compressible electrical spring contacts 308 and 310 with compression connector pad interface areas on the motherboard or graphics board in some embodiments. For example, alignment guides 316 may have corresponding alignment holes or alignment grooves in the compression connector pad interface area of the motherboard or graphics board to align the compression jumper pads 302 and 304 with the compression connector pad interface area. The alignment posts, for example, may fit into pre-located alignment holes on the motherboard or graphics board. The alignment guides 316 will align the compressible electrical spring contacts 308 and 310 with a plurality of contacts on the compression connector pad interface area of the motherboard or graphics board in some embodiments. In additional aspects, the alignment guides 316 may align the compression jumper pad holes 312 and 314 for receiving a compression screw with a compression screw receiver on or in the motherboard or graphics board in some embodiments. This may provide for ease of attachment of the compression screw through the hole 312 or 314 in the compression jumper pads 302 and 304 to a compression screw receiver. In some embodiments, the compression screw may even be disposed through the PCB of the motherboard or graphics board to a receiver, such as a nut, below or behind the motherboard or graphics board.

Figure 3B:
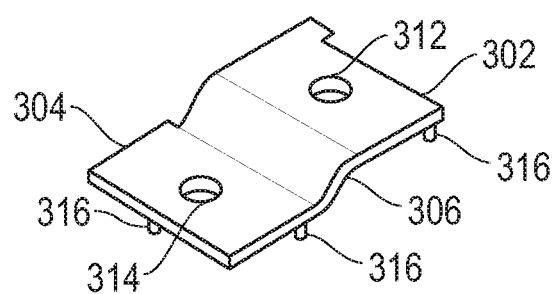
FIG. 3B is a perspective view of a flexible compression jumper connector according to an embodiment of the present disclosure.

In another embodiment, not depicted in FIGS. 3A and 3B, some aspects of embodiments of the present disclosure may utilize a flexible compression jumper connector, however the array of compressible electrical spring contacts 308 and 310 may be mounted to a compression connector pad interface area for one or either the motherboard or the graphics board instead of being disposed on the compression jumper pads. Mounting the compressible electrical spring contacts 308 and 310 may include soldering a plate including an array them to the compression connector pad interface area of the motherboard or graphics board. The compressible electrical spring contacts 308 and 310 on the plates may be mounted facing upward or away from the motherboard or graphics board. Then a compression jumper pad similar to either 302 and 304 but with an array of standard electrical contacts instead of compressible electrical spring contacts may be clamped to the mounted array of compressible electrical spring contacts 308 and 310.

The flexible compression jumper connector of this type may also include an adjustable jumper trace array cable between the two compression jumper pads similar to either 302 and 304 to traverse between the compression connector pad interface area of the motherboard and graphics board respectively. In a flexible compression jumper connector of this type in some embodiments, a clamping mechanism such as a compression screw may be disposed through a hole such as 312 and 314 to clamp the compression jumper pads, similar to 302 and 304, to the compressible electrical spring contacts 308 and 310 mounted on the compression connector pad interface areas of the motherboard and the graphics board. The compression screw may be disposed through the compression jumper pads 302 and 304, and the compressible electrical spring contact arrays 308 and 310, to a receiver on, in, or through the PCB of the motherboard or the graphics board in various embodiments. The receiver may be a compression screw receiver nut mounted on, in, or behind the PCB.

FIG. 3B shows a top perspective view of a flexible compression jumper connector according to an embodiment of the present disclosure. The flexible compression jumper connector shown in FIG. 3B includes a first compression jumper pad 302 and a second compression jumper pad 304 for operative coupling between either a motherboard or a graphics board. Between the first compression jumper pad 302 and the second compression jumper pad 304 is an adjustable jumper trace array cable 306 connecting a first array of compressible communication contacts of the first compression jumper pad 302 to a second array of compressible communication contacts of the second compression jumper pad 304. The adjustable jumper trace array cable 306 shows a bend to accommodate planar elevation differences between first compression jumper pad 302 and the second compression jumper pad 304 if the PCB of the motherboard and graphics board are not at the same planar elevation in some embodiments. For example, some offset may be necessary to accommodate a planar heat pipe or for providing orientation flexibility to the motherboard or graphics board relative to other components. As another example, some offset between the motherboard and graphics board may be necessary for alignment of external digital display data ports along a side of the information handling system in some embodiments.

The adjustable jumper trace array cable 306 may be a ribbon cable with a plurality of electrical communication wires or may be a rigid but bendable ribbon of metallic traces or communication connections between the first compression jumper pad 302 and the second compression jumper pad 304. The adjustable transition of the flexible jumper trace array cable 306 may have a bend zone with a curve or angle that may be adjusted to alter the height or vertical orientation of the compression jumper pads 302 and 304 with respect to one another. In other embodiments, the adjustable transition of the flexible jumper trace array cable 306 may be oriented with no curve or bend between the motherboard and graphics board, but the flexible compression jumper connector is usable for a plurality of internal transition options between motherboards and graphics boards for a variety of information handling system designs. Adjustment to the adjustable jumper trace array cable 306 may accommodate an offset in height of the motherboard and graphics board to permit alignment of the CPU with respect to the GPU in terms of height within the information handling system housing above the chassis and may be modified depending on the information handling system design the in which it is implemented. With this adjustability, reduced costs in implementing motherboard and graphics board designs may be realized since greater flexibility is provided to use motherboard and graphics board designs repeatedly throughout several different information handling system product specifications. Similarly, less invasive motherboard or graphics board design differences will also be necessary when different PCB designs are called for.

Each compression jumper pad 302 and 304 has a hole 312 and 314 respectively to accommodate a clamping mechanism in some embodiments. In at least one embodiment, hole 312 may accept a compression screw through the compression jumper pad 302 which may be used with a compression screw receiver, such as a nut, mounted on, in, or behind the motherboard to compress the compression jumper pad 302 to the motherboard. Similarly, hole 314 may accept a compression screw through the compression jumper pad 304 which may be used with a compression screw receiver, such as a nut, mounted on, in, or behind the motherboard to compress the compression jumper pad 304 to a graphics board. It is understood that in some embodiments, compression jumper pads 302 and 304 may be switched as to compression operative coupling between the motherboard or graphics board in some embodiments of the present disclosure. Further, compression jumper pads 302 and 304 may have alignment guides 316, such as alignment posts, guide bars, guide grooves or the like that may be used to line up compression jumper pads 302 and 304 with compression connector pad interface areas on the motherboard or graphics board in some embodiments. For example, alignment guides 316 may have corresponding alignment holes or alignment grooves in the compression connector pad interface area of the motherboard or graphics board to align the compression jumper pads 302 and 304 with the compression connector pad interface area. The alignment posts, for example, may fit into pre-located alignment holes on the motherboard or graphics board. Other types of alignment mechanisms may also be utilized in various embodiments.

Figure 3C:
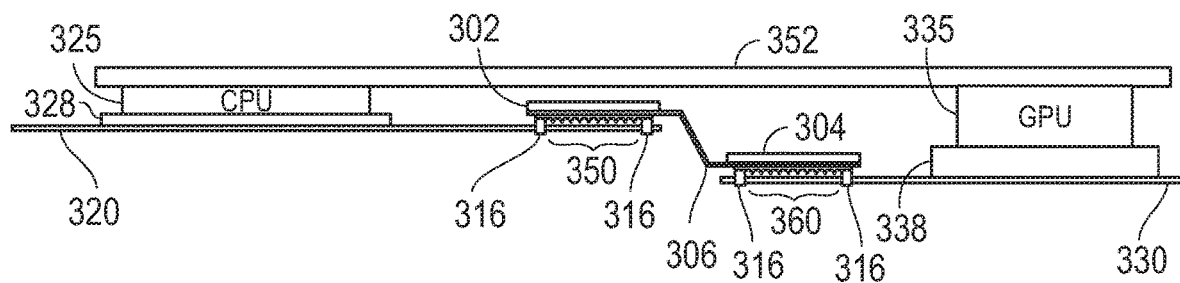
FIG. 3C is a graphic diagram showing a cross-section view of an offset correction for height difference between component boards with a flexible compression jumper connector according to an embodiment of the present disclosure.

FIG. 3C shows a cross section view of a flexible compression jumper connector implemented with a motherboard 320 and a graphic board 330 according to an embodiment of the present disclosure. The flexible compression jumper connector shown in FIG. 3C includes a first compression jumper pad 302 operatively coupled to a connector pad interface area 350 on motherboard 320. In another aspect, second compression jumper pad 304 is operatively connected to first compression jumper pad 302 via an adjustable jumper trace array cable 306. Second compression jumper pad 304 is also shown as operatively coupled to a connector pad interface area 360 on graphics board 330. A cross-section of compressible electrical spring connectors may also be seen in first and second compression jumper pads 302 and 304.

On the motherboard 320, a CPU 325 and CPU chip mount 328 are shown according to some embodiments. Likewise, on the graphics board 330, a GPU 335 and GPU chip mount 338 are similarly shown. Difference in height of the top of CPU 325 and the top of GPU 335 may be accommodated by the adjustable jumper trace array cable 306 bend, curve, or angle to adjust planar levels of compression jumper pads 302 and 304. In an example embodiment, this may be done to provide for a planar heat pipe 352 to be implemented on both the top of CPU 325 and the top of GPU 335 and across motherboard 320 and graphics board 330. In other embodiments, some motherboard to graphics board offset may be necessary for alignment with other components in the information handling system such as external display data ports with the chassis side of the information handling system.

Figure 3D:
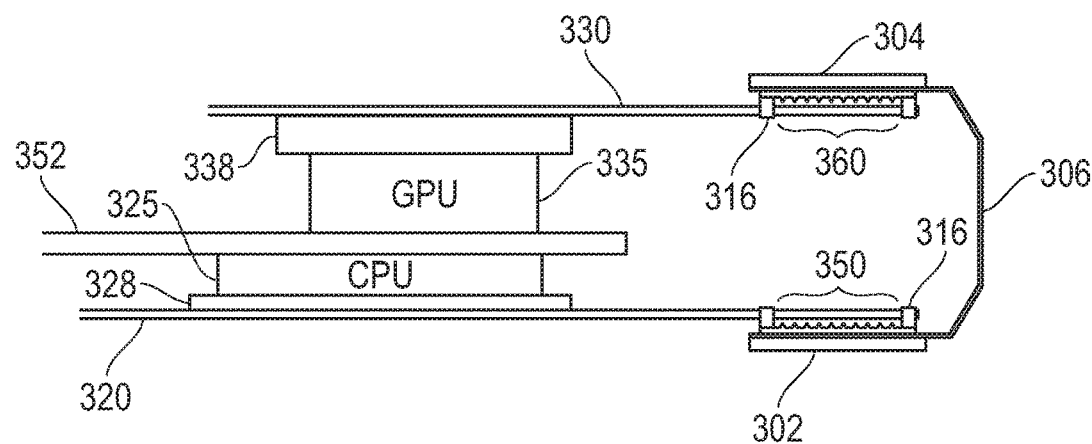
FIG. 3D is a graphic diagram showing a cross-section view of a flexible compression jumper connector used with a motherboard and graphics board according to another embodiment of the present disclosure.

FIG. 3D shows a cross section view of a flexible compression jumper connector implemented with a motherboard 320 and a graphic board 330 according to another embodiment of the present disclosure. In some instances, the implementation of a graphics board and motherboard is arranged such that minimal lateral or X and Y space is taken by the combination of the motherboard and graphics board in various embodiments. For example, the embodiment of FIG. 3D shows the graphics board and motherboard stacked such that lateral width and length of space taken in a chassis are minimized due to the stacking. This may be the case, for example, when a cooling fan or other component are already unavoidably thick, but size within the chassis of the information handling system is nonetheless to be minimized to reduce the overall size.

The flexible compression jumper connector shown in FIG. 3D includes a first compression jumper pad 302 operatively coupled to a connector pad interface area 350 on motherboard 320. In another aspect, second compression jumper pad 304 is operatively connected to first compression jumper pad 302 via an adjustable jumper trace array cable 306. Second compression jumper pad 304 is also shown as operatively coupled to a connector pad interface area 360 on graphics board 330. The adjustable jumper trace array cable 306 may be bent or curved around to allow the motherboard 320 and graphics board 330 to be stacked while maintaining high speed display data connectivity between the CPU 325 and GPU 335. A cross-section of compressible electrical spring connectors may also be seen in first and second compression jumper pads 302 and 304.

On the motherboard 320, a CPU 325 and CPU chip mount 328 are shown according to some embodiments. Likewise, on the graphics board 330, a GPU 335 and GPU chip mount 338 are similarly shown. In the shown embodiment, the motherboard 320 and graphics board 330 may be stacked such that the height of the top of CPU 325 and the top of GPU 335 may be stacked by the folded adjustable jumper trace array cable 306 bend, curve, or angle to sandwich a heat pipe 352. The curve, bend, or angle of the folded adjustable jumper trace array cable 306 may adjust planar levels of compression jumper pads 302 and 304 to size the stacking of the CPU 325 and GPU 335 with the heat pipe 352. In an example embodiment, this may be done to provide for a planar heat pipe 352 or near planar heat pipe to be implemented on both the top of CPU 325 and the top of GPU 335 and between motherboard 320 and graphics board 330. In some embodiments, the GPU 325 and GPU 335 need not be sandwiched directly on top of one another on either side of heat pipe 352, but may instead be offset to different parts of the heat pipe 352. As with other embodiments, it is understood that the heat pipe 352 need not be precisely planar, but fewer bends, angles, or turns may make the heat conductivity of heat pipe 352 more efficient. Thus, the flexible compression jumper connector may be used with a stacked motherboard 320 and graphics board 330 to minimize the complexity of heat pipe 352 in some embodiments without a requirement of a planar heat pipe.

In other embodiments, some motherboard to graphics board offset of the stacked motherboard and graphics board may be necessary for alignment with other components in the information handling system such as external display data ports with the chassis side of the information handling system or the like instead of alignment around a heat pipe 352. In yet other embodiments, both external component alignment and alignment around a heat pipe 352 may be adjusted for with the flexible compression jumper connector of the present embodiments.

Figure 3E:
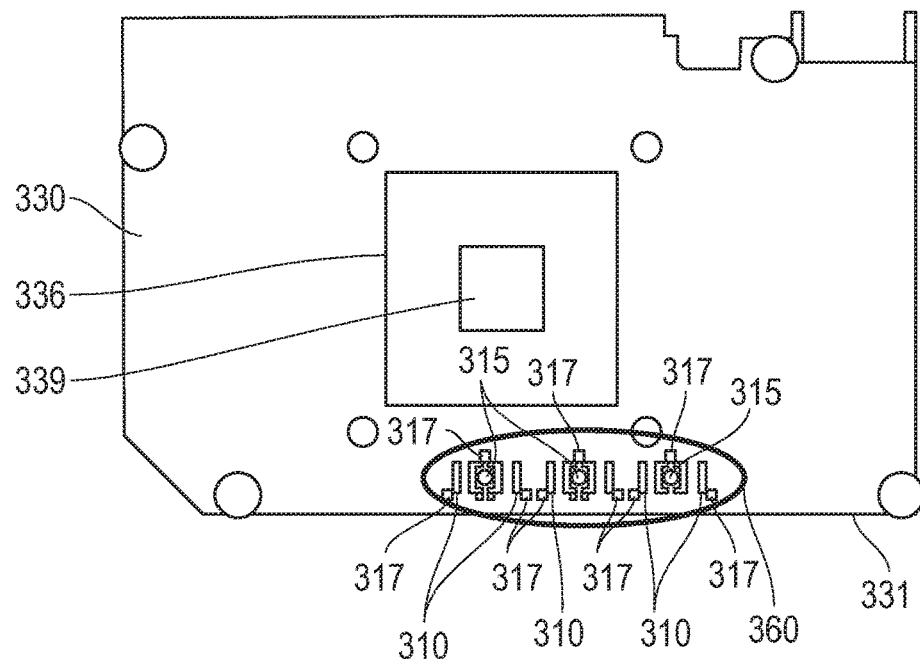
FIG. 3E is a graphic diagram showing a top view of graphics board with a compression connector pad interface area for operative coupling to a flexible compression jumper connector according to an embodiment of the present disclosure.

FIG. 3E shows a top view of a graphics board PCB 330 according to an embodiment of the present disclosure. Graphics board 330 includes a space for a GPU 339 and a space for a GPU mount 336. FIG. 3E shows an example of three connector pad interfaces in a connector pad interface area 360 (encircled) on the graphics board 330 along an edge 331. Graphics board 330 would be aligned adjacent to a motherboard (not shown) according some embodiments. Each of the connector pad interfaces in the connector pad interface area 360 on the graphics board 330 includes a plurality of electrical contacts 310 according to some embodiments. In some aspects, the plurality of electrical contacts 310 of the connector pad interfaces of the connector pad interface area 360 may be arranged to correspond to an array of compressible communications contacts in the compression jumper pad of the flexible compression jumper connector similar to that depicted in FIGS. 3A and 3B.

The graphics board 330 of FIG. 3E further shows alignment holes 317 or alignment grooves in the connector pad interface area of the graphics board corresponding to alignment guides 316 of FIGS. 3A and 3B that may align the compression jumper pads of one or more flexible compression jumper connectors. The alignment posts, for example, may fit into pre-located alignment holes 317 on the graphics board 330 along edge 331 that will be adjacent to the motherboard. Other types of alignment mechanisms may also be utilized in various embodiments. Further, graphics board 330 shows compression screw receivers 315 in or on the graphics board 330 according to some embodiments. In a further embodiment, the compression screw receivers may be mounted on the graphics board 330 at locations 315 or embedded in the PCB of graphics board 330 at 315. In other embodiments, 315 may be receiving holes through which compression screws may be disposed to a compression screw receiver behind the graphics board 330.

Figure 4:
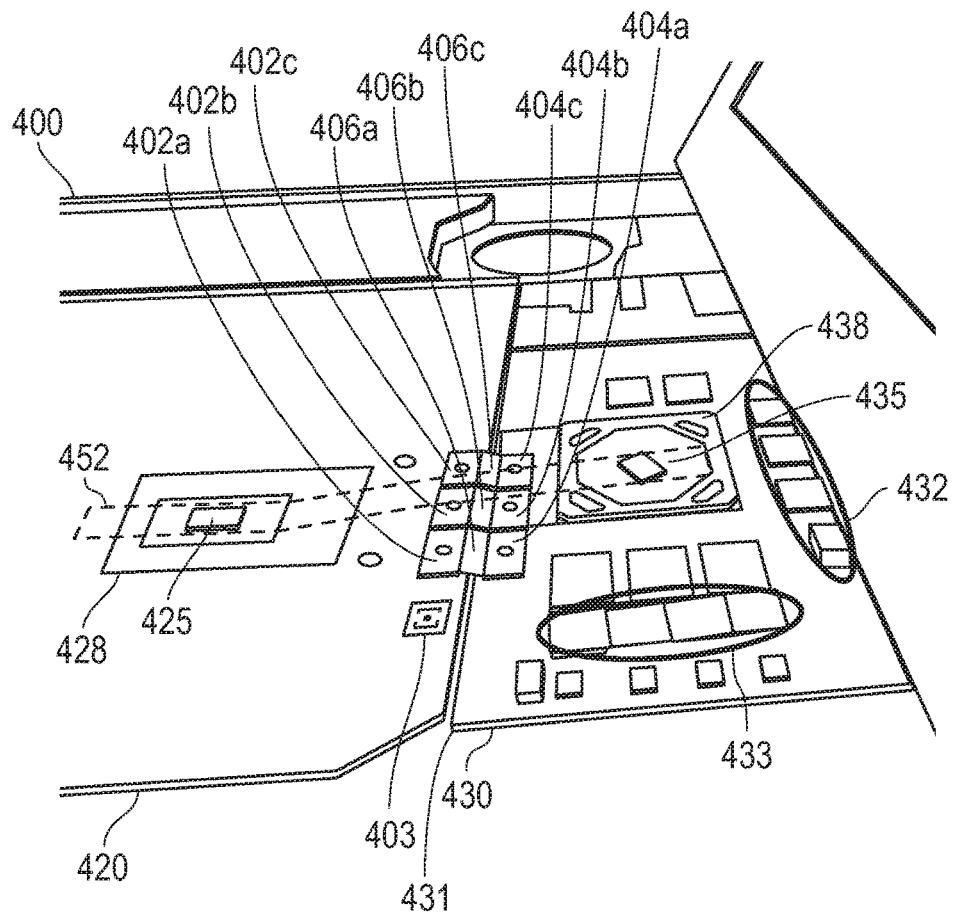
FIG. 4 is a perspective view of component boards in an information handling system cut away to show the flexible compression jumper connector between component boards according to an embodiment of the present disclosure.

FIG. 4 shows a cutaway perspective view of an example information handling system 400 including a motherboard 420 and a graphics board 430. Motherboard 420 and graphics board 430 may be arranged in information handling system 440 adjacent to one another such as along edge 431 of graphics board 430. Compression connector pad interface area of graphics board 430 along edge 431 may be aligned with a compression connector pad interface area of the motherboard such that a plurality of flexible compression jumper connectors may be operatively coupled between the PCBs to provide for digital data communications between the CPU 425 and GPU 435. The perspective view of the information handling system deploying the embodiments of the present disclosure shows a planar heat pipe 452 that may be disposed on top of CPU 425 and GPU 435 across the motherboard 420 and the graphics board 430.

A plurality of flexible compression jumper connectors are shown spanning between connector pad interface areas on the adjacent motherboard 420 and graphics board 430. Three flexible compression jumper connectors are shown each including a first compression jumper pad 402a, 402b, and 402c operatively coupled to motherboard 420 in an example embodiment. The three flexible compression jumper connectors in the shown embodiment each have a flexible jumper trace array cable 406a, 406b, and 406c operatively coupled to a second compression jumper pad 404a, 404b, and 404c. The second compression jumper pads 404a, 404b, and 404c are operatively coupled to graphics board 430 in the example embodiment. Additional or fewer flexible compression jumper connectors may be used for variable bandwidth as needed in various design embodiments. For example, an unused connector pad interface 403 is shown in the connector pad interface area of motherboard 420.

Motherboard 420 may include a CPU 425 with mounting 428. The CPU 425 and mounting 428 will have a first height for the top of the CPU 425 above motherboard 420. Graphics board 430 includes GPU 435 and GPU mounting structure 435 which may have a second height for the top of the GPU 435 above the graphics board 430. Graphics board 430 may also have additional components such as on-board memory capacity 433 which may provide for improved GPU 435 operation with the separate graphics board 430.

If the stack level of GPU 435 and mounting 438 is different from the stack level of CPU 425 and mounting 428, the flexible, adjustable jumper trace array cables 406a, 406b, and 406c for the flexible compression jumper connectors may be adjusted to bring the height of the top of CPU 425 and GPU 435 to the same level within the chassis of the information handling system. In this way, heat pipe 452 may be a planar heat pipe shared by CPU 425 and GPU 435. Graphics board 430 may also external display connector components 432 for interface outside of the chassis of the information handling system in various embodiments which may require adjustment of the offset of the motherboard 420 and graphics board 430 to align with chassis ports in some embodiments. The connector components 432 may be eDP, DP, USB, or other digital display connector components and these display connectors may be reconfigurable with respect to location for various graphics boards 430 designed for use in a variety of information handling systems produced by a manufacturer. It is understood that motherboard 420 and graphics board 430 offset adjustments with the presently disclosed embodiments may also be achieved to accommodate various other information handling system components in yet other embodiments.

Figure 5B:
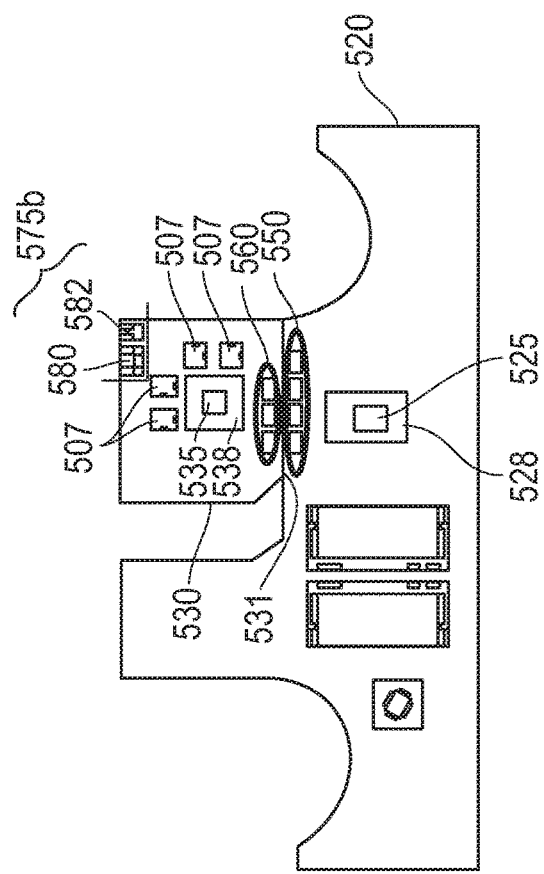
FIG. 5B is a top view of graphics board according to an adaptable graphics board form factor with adjacent orientation to a motherboard according to another embodiment of the present disclosure.
Figure 5A:
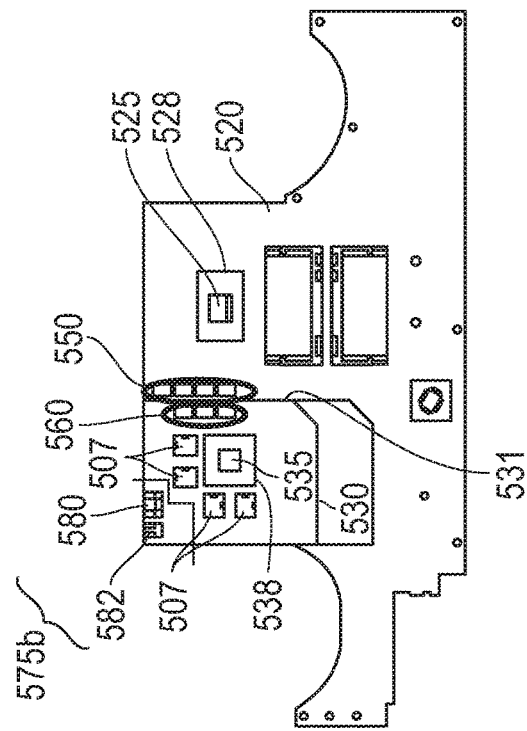
FIG. 5A is a top view of graphics board according to an adaptable graphics board form factor with adjacent orientation to a motherboard according to an embodiment of the present disclosure.

FIG. 5A shows a top view of an adaptable graphics board PCB 530 adjacently aligned with motherboard 520 according to one embodiment of the present disclosure. The adaptable graphics board 530 includes a reconfigurable zone subset of components 575a. The remainder of graphics board 530 layout comprises a set of core components that are part of the adaptable graphic board form factor which may be utilized with a plurality of model specifications of information handling system with modification needed only of the reconfigurable zone subset of components 575a. The set of core components includes a GPU 535 and a space for a GPU mount 538. The set of core components further includes a plurality of graphics memory chips 507 disposed by the GPU 535. The set of core components also includes, in some embodiments, a connector pad interface area 560 for connection to a motherboard 520 via one or more the flexible compression jumper connectors according to various embodiments described herein.

Connector pad interface area 560 shows an example of three connector pad interfaces on the adaptable graphics board 530 along an edge 531 to be shared with an edge having connector pad interface area 550 of motherboard 520. In some embodiments, the connector pad interface area 560 of adaptable graphics board 530 may be part of a reconfigurable zone subset of components such that the adaptable graphics board 530 may be reoriented with respect to motherboards in several model specification designs of information handling system products. This embodiment may provide for additional flexibility to utilize the set of core components for an adaptable graphics board form factor with a greater group of model specification types for information handling system assemblies in some aspects.

Utilization of an adaptable graphics board form factor with a set of core components permits re-utilization of layouts and design efforts for typically the most difficult or costly aspects of the graphics board design. The set of core components may include aspects such as design selection of location for the GPU 535 and the GPU mount 538. GPU 535 and GPU mount 538 locations will involve the GPU chip pin breakout in the PCB, routing between the GPU 535 and graphics memory, power planes under the GPU to support the GPU operation, and bus connectivity to the information handling system including PCIe, DisplayPort, or other display data bus connectivity. For example, display data lanes or channels to the motherboard 520 via the connector pad interface 560 from the GPU 535 may be part of the set of core components.

Similarly, the graphics memory placement also comprises difficult design aspects for the adaptable graphics board according to aspects of the present disclosure. The graphics memory 507 includes the memory placement, pin breakouts, and routing between the GPU and the memory. Further, additional aspects of the set of core components related to graphics memory 507 may include the power planes for supplying power to the memory devices 507. With the adaptable graphics board form factor having a set of core components and a design interface point for connectivity with a reconfigurable zone subset of components, the simpler reconfigurable zone subset of components may be re-oriented or reorganized, but still connect to the design interface point for connectivity with the set of core components.

The reconfigurable zone subset of components 575a may be linked via a communication and power interface that functions as a design interface point. This design interface point may not be a point per se, but an area on the PCB or a collection of interface traces or plane locations that may be to link the set of core components area of adaptable graphics board 530 to reconfigurable zone subset of components 575a or for different configurations of 575a as discussed herein. The design interface point may be located near the reconfigurable zone subset of components such as 575a. For example, the design interface point may be embedded communication and power plane traces or layers to which a re-oriented reconfigurable zone subset of components, such as 575a, may be easily linked when using the adaptable graphics board form factor in designing the adaptable graphics board 530 for use with several model specifications.

This flexibility of having reconfigurable zone subset of components which may be reorganized or re-oriented is beneficial in the development of a plurality of model specifications for information handling system products requiring a separate graphics board for enhanced graphics performance. Several embodiments herein provide for an adaptable graphics board form factor with at least one reconfigurable zone to limit the number of individual specific graphics board designs, each having substantially complete redesign, necessary to fill out all information handling system product model specifications offered by a manufacturer. Standardizing at least the difficult parts of the adaptable graphics board with respect to design in an adaptable graphics board form factor may decrease costs and time involved with selecting graphics boards for use with information handling system chassis layouts.

Adaptable graphics board 530 is aligned adjacent to a motherboard 520 according some embodiments. Each of the connector pad interfaces in the connector pad interface area 560 on the graphics board 530 includes a plurality of electrical contacts according to some embodiments herein and have a counterpart set of connector pad interfaces in connector pad interface area 550 on the motherboard. Motherboard 520 also has a CPU 525 and CPU chip mount 528 as well as many other information handling system components as understood in the art which may be mounted on motherboard 520. Several example embodiment components are discussed with respect to FIG. 1 and may reside on the motherboard in some examples.

FIG. 5B shows a top view of an adaptable graphics board PCB 530 adjacently aligned with motherboard 520 according to another embodiment of the present disclosure. The adaptable graphics board 530 includes a reconfigurable zone subset of components 575b which is re-oriented with respect to the remainder of graphics board 530 layout. As previously described, the remainder of graphics board 530 layout may comprise a set of core components that are part of the adaptable graphic board form factor to be utilized with a plurality of model specifications of information handling system products. In some embodiments, plural reconfigurable zones may be used for different subsets of components of the adaptable graphics board form factor. For example, a reconfiguration zone may be used for the connector pad interfaces in some embodiments to provide additional flexibility as to where they are located. The adaptable graphics board form factor including the set of core components of adaptable graphics board 530 may be used with a plurality of types of motherboards 520 as shown in FIGS. 5A and 5B in an example embodiment.

The modification shown in the adaptable graphics board 530 is to the reconfigurable zone subset of components 575b of adaptable graphics board 530. In the present embodiment of FIG. 5B, the reconfigurable zone subset of components 575b is rotated with respect to the orientation shown at 575a of FIG. 5A. Components 580 and 582 are rotated such that they are disposed along a different edge of graphics board 530 in FIG. 5B than they were in FIG. 5A. The reconfigurable zone subset of components 575b may be linked via a communication and power interface, that may be a design interface point, used in the PCB of the set of core components area of adaptable graphics board 530 and commonly linkable to either 575a or 575b configurations. The communication and power interface traces located near the reconfigurable zone subset of components of either 575a or 575b orientation may be embedded communication and power plane traces or layers. These embedded communication and power traces or layers may easily link to a re-oriented reconfigurable zone subset of components when using the adaptable graphics board form factor in designing the adaptable graphics board 530 for use with several model specifications. The set of core components need not be re-designed while the simpler reconfigurable zone subset of components in either orientation 575a or 575b may be customized or oriented for use between various model specifications of information handling system products. In an example embodiment, the reconfigurable zone subset of components oriented as either 575a or 575b may be an I/O module for interface with external display data ports 580 or 582.

The set of core components includes a GPU 535 and a space for a GPU mount 538. The set of core components further includes a plurality of graphics memory chips 507 disposed by the GPU 535. The set of core components also includes, in some embodiments, a connector pad interface area 560 for connection to a motherboard 520 via one or more flexible compression jumper connectors according to various embodiments described herein. The set of core components may include design selection of the GPU 535 and the GPU mount 538 locations. GPU 535 and GPU mount 538 locations will involve the GPU chip pin breakout in the PCB, routing between the GPU 535 and graphics memory, power planes under the GPU to support the GPU operation, and bus connectivity interface link to the information handling system including PCIe, DisplayPort, or other display data bus connectivity. For example, display data lanes or channels from the connector pad interface 560 on the adaptable graphics board to the GPU 535 may be part of the set of core components in some embodiments. In other embodiments, a reconfigurable zone may include the connector pad interface 560 that may be operatively coupled to GPU 535 via a design interface point for the display data lanes or channels.

Similarly, as described above, the graphics memory placement comprises difficult design aspects for the adaptable graphics board according to aspects of the present disclosure. The graphics memory 507 includes the memory placement, pin breakouts, and routing between the GPU and the memory. Further, additional aspects of the set of core components related to graphics memory 507 may include the power planes for supplying power to the memory devices 507. Thus, as can be seen between FIGS. 5A and 5B, the adaptable graphics board form factor with a set of core components and a design interface point for connectivity with a reconfigurable zone subset of components enables the simpler reconfigurable zone subset of components to be re-oriented or reorganized without a full redesign for the set of core components.

The adaptable graphics board 530 is aligned adjacent to a motherboard 520 along edge 531 in both FIGS. 5A and 5B according some embodiments. However a position of external display data ports 580 or 582 or other components may need to be changed to work with chassis configurations of a plurality of model specifications in various embodiments. Again, the connector pad interfaces in the connector pad interface area 560 on the graphics board 530 includes a plurality of electrical contacts according to various embodiments herein. The connector pad interfaces operatively couple to a counterpart set of connector pad interfaces in connector pad interface area 550 on the motherboard 520. Motherboard 520 also has a CPU 525 and CPU chip mount 528 as well as many other information handling system components as understood in the art which may be mounted on motherboard 520. Several example embodiment components are discussed with respect to FIG. 1 and may reside on the motherboard in some examples.

Figure 6B:
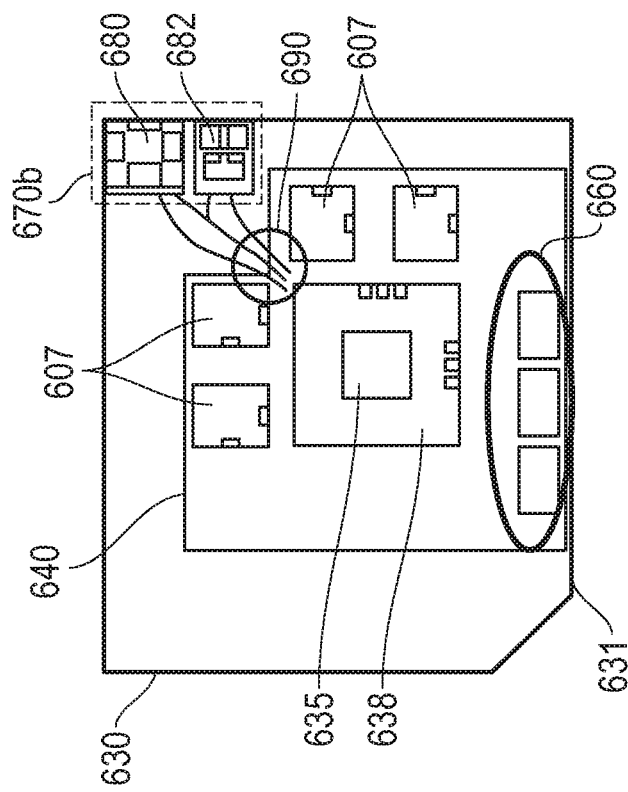
FIG. 6B is a top view of graphics board according to an adaptable graphics board form factor having a reconfigurable zone according to another embodiment of the present disclosure.
Figure 6A:
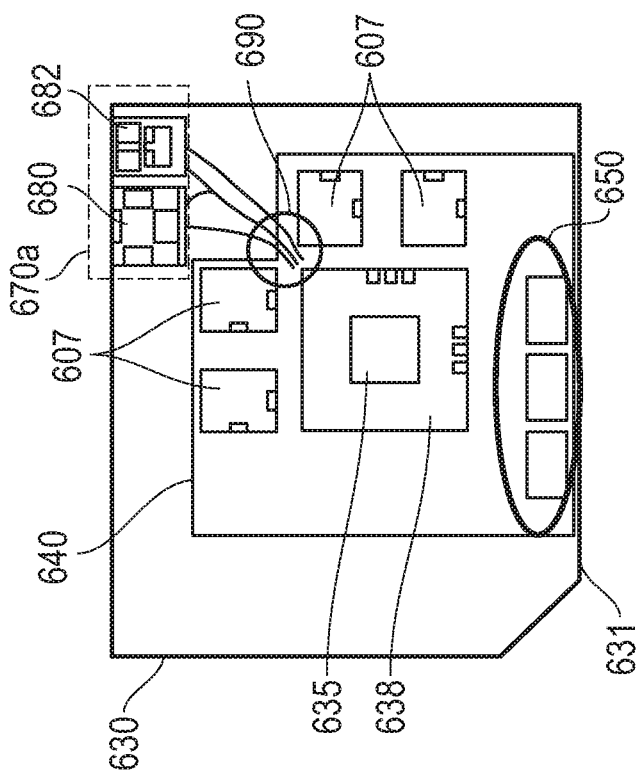
FIG. 6A is a top view of graphics board according to an adaptable graphics board form factor having a reconfigurable zone according to an embodiment of the present disclosure.

FIG. 6A shows a closer top view of an adaptable graphics board PCB 630 according to one embodiment of the present disclosure. The adaptable graphics board 630 includes a reconfigurable zone subset of components 670a. The remainder of graphics board 630 layout comprises a set of core components 640 that are part of the adaptable graphic board form factor which may be utilized with a plurality of model specifications of information handling systems. With the adaptable graphics board form factor, modification is only needed of the reconfigurable zone subset of components 670a as described in embodiments above in FIGS. 5A and 5B. The set of core components includes a GPU 635 and a space for a GPU mount 638 as well as a plurality of graphics memory chips 607 and a connector pad interface area 650 with a plurality of connector pad interfaces shown along edge 630 according to various embodiments described herein. The set of core components may also include the GPU 635 and the GPU mount 638 locations, memory locations, the GPU chip pin breakout in the PCB, routing between the GPU 635 and graphics memory 607, power planes under the GPU 635 and memory 607 to support their operation, and bus connectivity interface links to the motherboard including PCIe, DisplayPort, or other display data bus connectivity. The set of core components 640 represent several aspects of the adaptable graphics board layout and implementation that are more complicated to achieve and implement. Accordingly, flexible re-use of the set of core components 640 with different variations of an adaptable graphics board usable in a plurality of model specifications for arrangement in the chassis of different information handling system products will improve efficiency and costs of PCB production and assembly.

To enable re-use of the adaptable graphics board form factor for PCB production, reconfigurability is needed. A reconfigurable zone subset of components 670a, including for example components 680 and 682, must be linked to the set of core components 640. The link may occur a design interface point 690 to interface the set of core components 640 and the reconfigurable zone subset of components 670a when in any number of orientations or with a variety of layout organizations. In an example embodiment, the design interface point 690 may comprise a communication or power interface that may be commonly used in the PCB to link the set of core components area 640 to different configurations of reconfigurable zone subset of components 670a. In the shown embodiment, three communication and power interface traces in design interface point 690 are located near the reconfigurable zone subset of components 670a. These may include embedded communication traces and at least one power plane trace or layer as shown. It is understood that any number of communication or power plane traces may be utilized to link to components such as 680 and 682 in reconfigurable zone subset of components 670a according to various embodiments.

FIG. 6B shows a closer top view of an adaptable graphics board PCB 630 according to another embodiment of the present disclosure. The adaptable graphics board 630 includes a reconfigurable zone subset of components 670b which is re-oriented with respect to the remainder of graphics board 630 layout as compared to 670a of FIG. 6A. As previously described, the remainder of graphics board 630 layout comprises a set of core components 640 that are part of the adaptable graphic board form factor which may be utilized with a plurality of model specifications of information handling system products.

The modification shown in the adaptable graphics board 630 is to the reconfigurable zone subset of components 670b of adaptable graphics board 630 which is rotated relative to orientation 670a from FIG. 6A. Components 680 and 682 are rotated such that they are disposed along a different edge of graphics board 630 in FIG. 6B than they were in FIG. 6A. The reconfigurable zone subset of components 670b may be linked via a communication and power interface, that serves as a design interface point 690, for the adaptable graphics board form factor. The design interface point may be used in the PCB of the set of core components area of adaptable graphics board 630 and linked to either 670a or 670b configurations. The communication and power interface traces of the design interface point are shown located near the reconfigurable zone subset of components either 670a or 670b. For example, embedded communication and power plane traces or layers may be linkable to re-oriented or reorganized reconfigurable zone subset of components for various model specifications of information handling system products. Again, utilization of the embodiments herein permits avoidance of re-designing the set of core components 640 while the simpler reconfigurable zone subset of components in either orientation 670a or 670b may be customized or oriented for use between various model specifications of information handling system products.

Figure 6C:
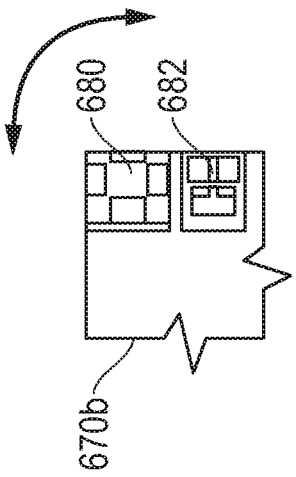
FIG. 6C is a top view of a reconfigurable zone for an adaptable graphics board form factor according to an embodiment of the present disclosure.

FIG. 6C shows the reconfigurable zone subset of components in the 670b orientation according to an embodiment. The reconfigurable zone subset of components 670b may simply be rotatable as shown in some embodiments. In an example embodiment, the reconfigurable zone subset of components in either 670a or 670b orientation may be an I/O module for interface with external display data ports 680 or 682. In further example embodiments external display ports components 680 or 682 may be HDMI, DisplayPort, USB or other display data external connector sockets of a variety of revisions to those standards as understood by those in the art. The I/O module of the present embodiment of FIG. 6C shows that the orientation may be easily rotated in the design of the adaptable graphics board in some embodiments with a change in communication and power linkage locations. In this way, the reconfigurable zone may be integrated with the set of core components via a design interface point providing data communication lines and/or power to link to structures in the PCB of the reconfigurable zone subset of components 670b in either rotated configuration.

The depictions in FIGS. 3A-3E, FIG. 4, FIG. 5A, FIG. 5B, and FIGS. 6A-6C are meant for illustration and do not necessarily represent accurate sizes or relationships between aspects of the flexible compression jumper connectors depicted, the motherboards, graphics boards, components, or the information handling system depicted therein. It may also be appreciated that variations on the configurations are also contemplated including location and alignments of motherboard, graphics boards, components thereon. For example, the flexible compression jumper connectors may not include compressible communication contacts on the compression jumper pads 302 and 304. Those compressible communication contacts may instead be mounted to the compression connector pad interface areas of the motherboard or graphics board such that the jumper pads are compressed onto the compressible communication contacts on the motherboard or graphics board PCB. Other variations of the embodiments are contemplated.

Figure 7:
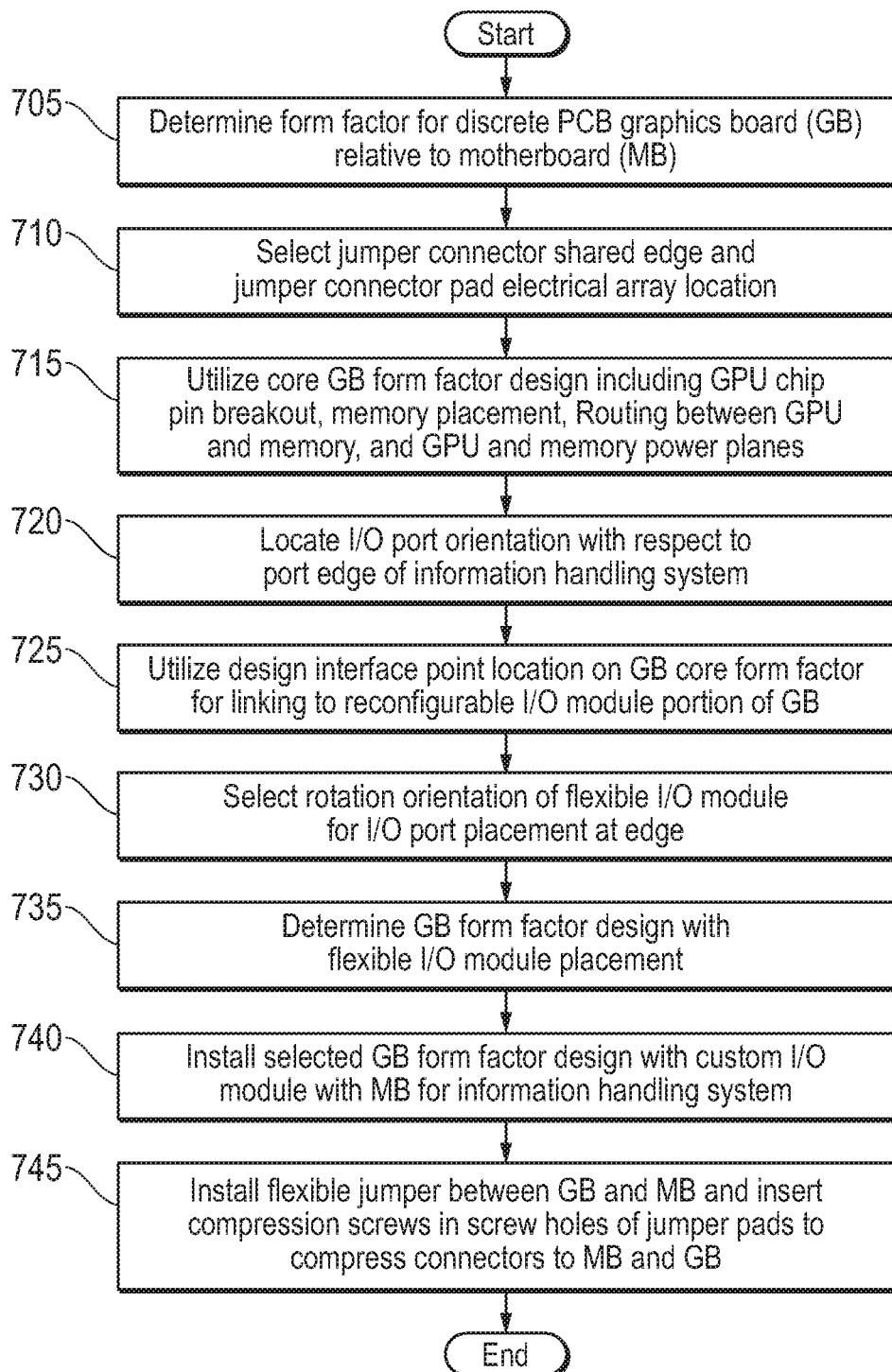
FIG. 7 is a flow diagram illustrating method of assembly with a graphics board having a customized reconfigurable zone within the adaptable graphics board form factor according to an embodiment of the present disclosure.

FIG. 7 shows a method of selecting an adaptable graphics board and assembling with a motherboard in an information handling system operatively coupled with one or more flexible compression jumper connectors according to an embodiment of the present disclosure. At 705, a selection must be made of a first model specification for an information handling system chassis layout from among a plurality of model specifications with which the adaptable graphics form factor may be implemented according to embodiments herein. Selection of the chassis layout with respect to graphics board and motherboard locations may be specified for the selected first model specification.

Proceeding to 710, the shared edge across which one or more flexible compression jumper connectors may span between corresponding connector pad interfaces on the adaptable graphics board and the motherboard may be identified in the first model specification. The adaptable graphics board layout will require a selected connector pad interface area along the edge of the adaptable graphics board shared with the motherboard. The contact arrays of the connector pad interfaces will be located in the connector pad interface area of the adaptable graphics board. The connector pad interface is for receiving a jumper connector pad for one or more flexible compression jumper connectors. In some embodiments, the connector pad interface area location may be part of a set of core components of the adaptable graphics board form factor for board layout design.

In other embodiments, flexibility may be desired for the location of the connector pad interface area to provide for additional adaptability of the graphics board form factor. In those embodiments, a reconfigurable zone subset of components may encompass the connector pad interface area. The connector pad interface area may include the connector pad interface electrical contact array or arrays that may be included in at least one reconfigurable zone in such embodiments. In other aspects of such embodiments, a separate reconfigurable zone may be utilized as well for other reconfigurable zone subsets of components such as an I/O module as described in embodiments herein.

At 715, the set of core components may be utilized from the adaptable graphics board form factor and may include the remainder of graphics board layout that is not part of one or more reconfigurable zone subsets of components. The set of core components will involve more complicated and difficult design elements of the components on a graphic board in some embodiments. The set of core components may be utilized with a plurality of model specifications of information handling system. Modification may then be needed only of the one or more reconfigurable zone subset of components.

The set of core components includes a GPU and a space for a GPU mount as well as a plurality of graphics memory chips in some embodiments. The set of core components may also include the GPU and memory locations, the GPU chip pin breakout in the PCB, the memory pin breakout, routing between the GPU 635 and graphics memory 607, power planes under the GPU and memory to support their operation, and bus connectivity interface link to other parts of the information handling system including PCIe, DisplayPort, or other display data bus connectivity. In an optional embodiment, the set of core components implemented in the adaptable graphics board form factor may also include one or more connector pad interface areas with a plurality of connector pad interfaces along an edge to be shared with the motherboard. Since the set of core components represent several aspects of the adaptable graphics board layout with implementation that is more complicated, flexibility to re-use this portion of the adaptable graphics board form factor for a plurality of model specification chassis arrangements will improve efficiency and costs of PCB production and assembly.

Selection of the first model specification will also indicate a location for reconfigurable zone subset of components on the adaptable graphics board at 720 in some embodiments. For example, in the case that at least one reconfigurable zone subset of components includes an I/O module for connectivity of the adaptable graphics board to display data external port locations, location of those external display data ports in the chassis may be identified. Further, the location of the external display data ports for the first model specification, such as DisplayPort, HDMI, USB, or other display data communication port components, will be identified on the adaptable graphics board. The external display data ports or connector hardware components will be located to align with the external locations along an edge or back of the information handling system chassis for the selected first model specification in an example embodiment.

The adaptable graphics board form factor will also be provided for flexibility to utilize the reconfigurable zone subset of components such as the I/O module described above to easily interface with the established set of core components. The set of core components for the adaptable graphics board form factor will include a design interface point to interface with the reconfigurable zone subset of components at 725. The design interface point may include one or more communication and power interface traces to couple with the reconfigurable zone subset of components. In embodiments, the design interface point may be on the set of core components, but located near the reconfigurable zone to operably couple to the subset of components therein.

For example, a common I/O module connection location in the set of core components may be used as a design interface point with the reconfigurable I/O module in a plurality of orientations or configurations. The design point interface may include a plurality of communication and power traces or planes to be operatively connected to external display data ports, such as sockets for external display connections, among components in the reconfigurable zone subset of components. Further, at 730, the overall rotation of the flexible, reconfigurable I/O module may utilize placement of the external display port socket locations on an edge of the adaptable graphics board to determine the orientation of the reconfigurable I/O module with respect to the remaining set of core components. The rotation of the reconfigurable zone, such as a reconfigurable I/O module, may provide for communication and power coupling from the design point interface to the components on the reconfigurable zone subset components.

Upon determination of the reconfigurable zone orientation, such as rotation or organization and location of components and their connections the PCB design of the adaptable graphics board to be used with the selected first model specification may be determined at 735. In an example embodiment, the adaptable graphics board design may be determined using the above aspects to provide for the flexible I/O module placement and location of external display data port socket hardware on the adaptable graphics board.

At 745, the motherboard and adaptable graphics board may be operably coupled with one or more flexible compression jumper connectors according to various embodiments herein. Compression screws or another clamping mechanism may be utilized to compress compressible electrical contact arrays of each flexible compression jumper connector to a connector pad interface area of the adaptable graphics board or the motherboard. For example, compression screws may be disposed through holes in the compression jumper pads to receivers on the respective adaptable graphics board or motherboard.

The motherboard and the adaptable graphics board may be arranged with respect to one another in the chassis of the selected first model specification. Adjacent orientation of the adaptable graphics board to the motherboard may be used to reduce the height or z-space occupied by both PCB boards with the information handling system. This may assist in reducing the thickness of the information handling system. Stacking orientation may be used to reduce the planar length or width area occupied by the PCB boards in the chassis in other embodiments.

As described with other embodiments, adjustment of levels of the tops at least one CPU and the top at least one GPU may be better aligned with respect to a heat pipe by adjusting the flexible compression jumper connector or connectors between the motherboard and the graphics board thus reducing complexity of heat pipe implementation. In other aspects, alignment of the motherboard and graphics board may be adjusted with the flexible transition provided by the compression jumper connector or connectors to accommodate alignment with other information handling system components, such as external display data ports, within the chassis of the first model specification. At this point the process may end. It is appreciated that the process described with respect to FIG. 7 may be utilized for any selected model specification from among a plurality of model specifications of information handling system products. In this way, the adaptable graphics board form factor may be utilized with reduced modification needed and applied to a wide variety of chassis layouts including a variety of motherboard designs for several product models. Such a feature is beneficial to costs and time of development of graphics boards for use with model specification assemblies of a wider variety of information handling system models and improving overall design efficiencies.

FIG. 8A shows a top view of a PCB for an adaptable graphics board 830 according to one embodiment of the present disclosure. The adaptable graphics board 830 includes a PCB for a reconfigurable I/O module board 870a mounted in the upper right corner in an embodiment. The remainder of graphics board 830 comprises a set of core components 840 that are part of the adaptable graphic board form factor which may be utilized with a plurality of model specifications of information handling systems. With the adaptable graphics board 830, the reconfigurable I/O module board 870a need only be rotated into position such that external display data ports 880 and 882 are aligned along a desired edge to be implemented with a model specification for an information handling system. The set of core components 840 includes a GPU 835, a GPU mount 838, a plurality of graphics memory chips 807, and a connector pad interface area 850. As with various embodiments herein, the connector pad interface area 850 may include one or more connector pad interfaces shown along edge 831 according to various embodiments described herein. In some embodiments, edge 831 may be aligned along a shared edge with a motherboard (not shown) having one or more connector pad interfaces along a corresponding PCB edge. In such embodiments, a flexible compression jumper connector may be used to span between the motherboard and operatively coupled to the connector pad interface area 850. The flexible compression jumper connector may provide for lanes or channels for display data and commands between the CPU and the GPU 835. Utilization of the flexible compression jumper connector (not shown) to operatively couple the motherboard and adaptable graphics board 830 provides for flexibility to use several optional adjacent or stacked orientations between the motherboard and adaptable graphics board 830. This permits better adaptability among a plurality of model specifications for multiple information handling system product types as described in several embodiments herein. Further, the variety of adaptable orientations permitted with the adaptable graphics board 830 and use of flexible compression jumper connectors provides for benefits of reduced thickness in some embodiments or reduced x,y space occupancy in other embodiments for a variety of model specifications.

The set of core components of the adaptable graphics board 830 may further include the GPU 835 location, the GPU mount 838 location, memory locations, the GPU chip pin breakout in the PCB, routing between the GPU 835 and graphics memory 807, power planes under the GPU 835 and memory 807 to support their operation, and bus connectivity interface links to the motherboard including PCIe, DisplayPort, or other display data bus protocols. The set of core components 840 represent several aspects of the adaptable graphics board layout and implementation that are more complicated to achieve and implement. Accordingly, the set of core components 840 may be re-used with only variation of the orientation of the reconfigurable I/O module board 870a and a dual compression connector (not shown) to operatively couple the reconfigurable I/O module board 870a with the base portion of the adaptable graphics board 830. In this way, different variations of the adaptable graphics board 830 may be created that are usable in a plurality of model specifications for arrangement in the chassis of different information handling system products. With only re-orientation of reconfigurable I/O module board 870a necessary in some embodiments, this will improve efficiency and costs of PCB production and assembly.

The reconfigurable I/O module board 870a includes a compression screw hole 814 or other structure to provide for clamping the reconfigurable I/O module board 870a to the main portion of the adaptable graphics board 830. A compression screw may be disposed through 814, or another clamping system may be used, to compress compressible electrical contacts to make an electrical and mechanical operative coupling. The compression screw may be threaded into a compression screw receiver mounted on, in, or under the adaptable graphics board 830. The compression screw or other clamping mechanism compresses one or more compressible electrical contacts to establish a mechanical and electrical operative coupling between the reconfigurable I/O module board 870a and the adaptable graphics board 830 in various embodiments. The compressible electrical connectors may be disposed on a dual compression connector inserted between the reconfigurable I/O module board 870a and the main portion of the adaptable graphics board 830 as described herein. Reconfigurable I/O module board 870a may have an array of electrical contacts to interface with the compressible electrical contacts of the dual compression connector on one side in an embodiment. Similarly, a reconfigurable I/O module interface may include an array of electrical contacts as well at which the compressible electrical contacts of a second side of the dual compression connector are compressed. In other embodiments, the compressible electrical connectors may be mounted on the reconfigurable I/O module interface of the main portion of the adaptable graphics board or on the reconfigurable I/O module board 870a instead.

The reconfigurable I/O module board 870a will be re-orientable such that location or placement of one or more components may be adjusted to fit various model specifications. This may include, for example, reorienting components 880 and 882, which are operatively connected to the set of core components 840 in a plurality of configurations as described further in embodiments herein. In the shown embodiment of FIG. 8A, the reconfigurable I/O module board 870a is oriented such that external I/O ports 880 and 882 are oriented along a first edge of the adaptable graphics board 830. External I/O display data ports 880 and 882 may be HDMI, DisplayPort, USB, or other ports capable of accommodating other protocols. In the shown embodiment, the reconfigurable I/O module board 870a is shown with I/O components 880 and 882 arranged along the top edge of the adaptable graphics board 830 opposite the connector pad interface area 850 along edge 831. It is understood that the adaptable graphics board may be implemented in any orientation with a motherboard in the chassis of an information handling system including in adjacent or stacked implementations in various model specification requirements. Example embodiments depicted in FIGS. 3A-5B may be utilized with the reconfigurable I/O module board 870a of the adaptable graphics board 830 shown in FIG. 8A-8D.

FIG. 8B shows a top view of a PCB for an adaptable graphics board 830 according to another embodiment of the present disclosure. The adaptable graphics board 830 includes a PCB for a reconfigurable I/O module board 870b mounted in the upper right corner in another embodiment.

As with FIG. 8A, remainder of graphics board 830 in FIG. 8B comprises a set of core components 840 that are part of the main portion of the adaptable graphic board 830 which may be utilized with a plurality of model specifications of information handling systems. The adaptable graphics board 830 includes the reconfigurable I/O module board 870b which is re-oriented with respect to the remainder of adaptable graphics board 830 layout as compared to 870a of FIG. 8A.

In the shown embodiment of FIG. 8B, the reconfigurable I/O module board 870b is oriented such that external display data ports 880 and 882 are oriented along a second edge of the adaptable graphics board 830. In the shown embodiment, the reconfigurable I/O module board 870b is shown with I/O components 880 and 882 arranged along the right edge of the adaptable graphics board 830 next to edge 831 with the connector pad interface area 850. It is understood that the adaptable graphics board may be implemented in any orientation with a motherboard in the chassis of an information handling system. Arrangement adaptable graphics board 830 with a motherboard may include various adjacent configurations where relative height of a CPU or GPU may be adjusted in some embodiments. In other embodiments, arrangement may be stacked implementations of the motherboard and the adaptable graphics board 830 around a heat pipe in various model specification requirements.

The modification shown in the adaptable graphics board 830 FIG. 8B is to the reconfigurable I/O module board 870b of adaptable graphics board 830 which is rotated relative to orientation 870a from FIG. 8A. In the example embodiment, reconfigurable I/O module board 870b is rotated 90° such that components 880 and 882 are disposed along a different edge of graphics board 830 in FIG. 8B. Adaptable graphics board 830 may then be utilized with port mountings in an information handling system chassis of a different model specification than that shown in FIG. 8A. Again, utilization of the embodiments herein permits avoidance of re-designing the set of core components 840 on the base portion of the adaptable graphics 830 while the reconfigurable I/O module board in either orientation 870a or 870b may be simply oriented at different 90° positions to customize it for use between various information handling system products. Utilization of a dual compression connector as described in embodiments below may enable reorientation with electrical data communication connections between the base portion of the adaptable graphics board 830 and the reconfigurable I/O module board 870b in either orientation in some embodiments. The shown example indicates a 90° rotation clockwise of the reconfigurable I/O module board between 870a and 870b between FIGS. 8A and 8B. It is contemplated that rotation may occur clockwise or counter-clockwise and may be made at any angle of rotation for alignment of components 880 and 882 as needed in various embodiments.

The reconfigurable I/O module board 870b shows a compression screw hole 814 or may incorporate other structures to provide for clamping the reconfigurable I/O module board 870b to the main portion of the adaptable graphics board 830. As described, a compression screw may be disposed through 814, or another clamping system, may be used to compress compressible electrical contacts to make an electrical and mechanical operative coupling between the reconfigurable I/O module board 870b and the main portion of the adaptable graphics board 830. The compression screw may be threaded into a compression screw receiver mounted on, in, or under the adaptable graphics board. This is discussed further in embodiments herein.

FIG. 8C shows a top view of a reconfigurable I/O module board 870b for use with the adaptable graphics board of embodiments herein. The reconfigurable I/O module board 870b may simply be rotatable as shown in some embodiments. In an example embodiment, the reconfigurable I/O module board in either 870a or 870b orientation may include mounted external display data ports 880 or 882. As described, the example embodiments of external display ports components 880 or 882 may be HDMI, DisplayPort, USB or other display data external connector sockets of a variety of data protocol standards or revisions of the same as understood by those in the art. The reconfigurable I/O module board 870b of the present embodiment of FIG. 8C shows that the orientation may be easily rotated relative to a set of core components on a portion of the adaptable graphics board to which reconfigurable I/O module board 870b is operatively coupled in various embodiments.

Operative coupling of the reconfigurable I/O module board 870b may occur via compression connection of electrical communication lanes or channels via compression contacts such as compressible electrical spring contacts. Compressible electrical spring contacts may be mounted on the reconfigurable I/O module board 870b, on the main portion of the adaptable graphics board, or may be disposed on a dual compression connector between the reconfigurable I/O module board 870b and the adaptable graphics board as described in various embodiments. The reconfigurable I/O module board 870b also includes a compression screw hole 814 or other structure to work with a clamping mechanism to provide for clamping the reconfigurable I/O module board 870b to the main portion of the adaptable graphics board shown in FIGS. 8A and 8B. A compression screw may be disposed through 814 to compress one or more compressible electrical contacts to establish a mechanical and electrical coupling between the reconfigurable I/O module board 870b and the main portion of the adaptable graphics board in various embodiments. In other embodiments, another clamping mechanism may be used instead of or in addition to a compression screw threaded into a compression screw receiver. Configuration and orientation of a dual compression connector disposed between the reconfigurable I/O module board and the main portion of the adaptable graphics board may be implemented in some embodiments to provide in communication and power linkage for either orientation 870a or 870b. In this way, the reconfigurable I/O module board 870b may be integrated with the set of core components via a reconfigurable I/O module interface on the main portion of the adaptable graphics board. The reconfigurable I/O module interface on the main portion of the adaptable graphics board may provide data communication lines and/or power to links to components such as 880 and 882 in the PCB of the reconfigurable I/O module board 870b in either rotated configuration.

FIG. 8D shows a top view of a PCB for an adaptable graphics board 830 according to another embodiment of the present disclosure. The adaptable graphics board 830 does not include a reconfigurable I/O module board mounted in the upper right corner in an embodiment and instead shows a reconfigurable I/O module interface 862 to which a reconfigurable I/O module board may be operatively coupled. As with FIGS. 8A and 8B, the remainder of the adaptable graphics board 830 in FIG. 8D comprises a set of core components 840 that are part of the adaptable graphic board which may be utilized with a plurality of model specifications of information handling systems. The adaptable graphics board 830 set of core components 840 includes graphics memory 807, a GPU 835, a GPU mount 838, a flexible jumper connector interface area 860 along an edge 831 and other aspects as described for FIGS. 8A and 8B. Again, it is understood that the adaptable graphics board 830 may be implemented in any orientation with a motherboard in the chassis of an information handling system including in an adjacent or stacked orientation in various model specification requirements.

The reconfigurable I/O module interface 862 shows a compression screw receiver 813 which may be threads in the PCB of the main portion of the adaptable graphics board 830 or may be a compression screw nut mounted on, in, or under the adaptable graphics board main portion 830. Still other embodiments may incorporate other structures to provide for clamping of a reconfigurable I/O module board to the reconfigurable I/O module interface 862 of the main portion of the adaptable graphics board 830.

As described, a compression screw may be disposed into compression screw receiver 813 or another clamping system may be used to compress compressible electrical contacts on a dual compression connector to make an electrical and mechanical operative coupling between the reconfigurable I/O module board and the reconfigurable I/O module interface 862. The dual compression connector may be disposed between the reconfigurable I/O module interface 862 and the reconfigurable I/O module board to be operatively coupled for communication of display data or power. In one embodiment, one side of the dual compression connector may have an array of compressible electrical contacts which may correspond to the array of contacts 864 on the reconfigurable I/O module interface 862.

The dual compression connector may include alignment guides, such as alignment posts, which may fit into the alignment guide receivers 817 in the PCB of the adaptable graphics board 830. The alignment guide receivers 817 will ease placement of the dual compression connector on the reconfigurable I/O module interface 862. For example, alignment guide recievers 817 may be holes in the PCB to receive alignment guide posts on a first side of a dual compression connector. In other embodiments, the adaptable graphics board may have alignment guides such as posts that fit into receivers of a dual compression connector instead. A similar alignment guide and alignment guide receiver combination may be utilized to align the reconfigurable I/O module board and the dual compression connector on a second side as described and shown in FIG. 9. For example, either the second side of the dual compression connector or the reconfigurable I/O module board may have alignment posts with the other having holes to receive the alignment posts in an example embodiment. The compression screw may be disposed through a hole in the reconfigurable I/O module board and a hole in the dual compression connector to a compression screw receiver 813 mounted on, in, or under the adaptable graphics board 830.

Compression via tightening of this compression screw may establish a mechanical and electrical contact between the compressible electrical contacts on the first side of the dual compression connector and the array of contacts 864 of reconfigurable I/O module interface 862 in an embodiment. Compression may also establish a mechanical and electrical contact between compressible electrical contacts on the second side of the dual compression connector and an array of contacts on the reconfigurable I/O module board in some embodiments. In other embodiments, an array of compressible electrical contacts may be used at 864 on the reconfigurable I/O module interface 862 of the adaptable graphics board to contact an array of contacts on the first side of the dual compression connector in some aspects. In yet other embodiments, an array of compressible electrical contacts may be used on the reconfigurable I/O module board to contact an array of contacts on the second side of the dual compression connector in other aspects. Further embodiments herein may utilize different clamping mechanisms.

The reconfigurable I/O module interface 862 and array of contacts 864 may provide to interface the set of core components 840 and the components of the reconfigurable I/O module board in any number of orientations for a variety of model specifications. In an example embodiment, the reconfigurable I/O module interface 862 may comprise a communication or power interface to link the set of core components 840 to different orientations of the reconfigurable I/O module board. The dual compression connector may be re-oriented as disposed between the reconfigurable I/O module interface 862 of the adaptable graphics board 830 and the reconfigurable I/O module board to provide both data communications and power connections to I/O display data ports in any rotated position. In the shown embodiment, the array of contacts 864 of the reconfigurable I/O module interface 862 must include a plurality of communication and power interface contacts which link to embedded communication traces and at least one power plane trace or layer of the main portion of the adaptable graphics board 830 according to various embodiments.

Figure 9:
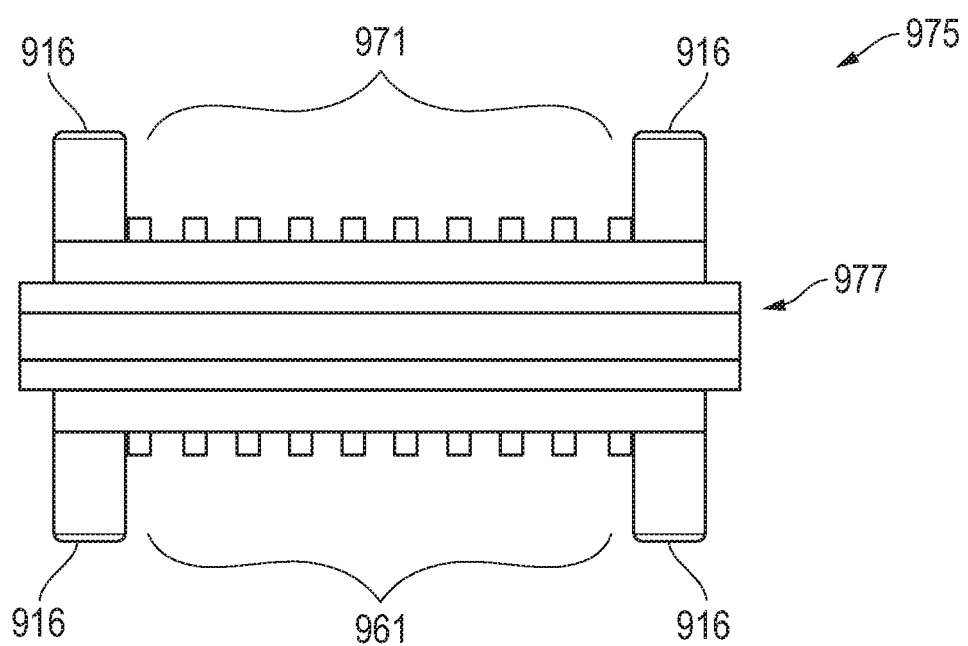
FIG. 9 is cross-section view of a dual compression connector according to an embodiment of the present disclosure.

FIG. 9 shows a cross section view of a dual compression connector 975 according to an embodiment of the disclosure. Dual compression connector 975 may be disposed between a reconfigurable I/O module interface on an adaptable graphics board and reconfigurable I/O module board having external I/O display data ports or other I/O module components. The dual compression connector 975 may include a first side which may include a first array of compressible electrical contacts 961 in some embodiments as described above. The dual compression connector 975 may also include a second side with a second array of compressible electrical contacts 971 in other embodiments. The first array of compressible electrical contacts 961 may be used to make an operative electrical coupling to the reconfigurable I/O module interface on the adaptable graphics board in some embodiments. The second array of compressible electrical contacts 971 may be used to make an operative electrical coupling to the reconfigurable I/O module board in some embodiments. In other embodiments, 961 may represent an array of electrical contacts on the first side of the dual compression connector 975 that may interface with an array of compressible electrical contacts mounted on the adaptable graphics board at reconfigurable I/O module interface. In yet further embodiments, 971 may represent an array of electrical contacts on the second side of the dual compression connector 975 that may interface with an array of compressible electrical contacts mounted on the reconfigurable I/O module board.

Between the first array of electrical contacts 961 and the second array of electrical contacts 971 of the dual compression connector, is a PCB layer 977. PCB layer 977 provides for routing and connection between individual contacts in the first array of electrical contacts 961 and individual contacts in the second array of electrical contacts 971. By rotation of the dual compression connector 975 to a first orientation, a first subset of the first array of electrical contacts 961 may be operatively coupled to the array of contacts of the reconfigurable I/O module interface of the adaptable graphics board. With this first subset, connection may be made through a subset of the second array of electrical contacts 971 on the second side to connect to the external display data ports of the reconfigurable I/O module in the first orientation.

Similarly, upon rotation of the dual compression connector 975 to a second orientation a second, different subset of the first array of electrical contacts 961 may operatively couple to the reconfigurable I/O module interface contacts. In the second orientation, some of the second, different subset of 961 may be re-used in some aspects. In other aspects, an entirely different subset of contacts may be used. With this second subset of the array of electrical contacts 961, connection may be made through to a different subset of the second array of electrical contacts 971 on the second side to connect the external display data ports of the reconfigurable I/O module in the second orientation. Additional orientations options may be available in some embodiments. With the plurality of orientations, different subsets of contacts for the first array of contacts 961 may be operatively coupled and provide coupling through to corresponding subsets of the second array of contacts 971 on the second side of the dual compression connector 975. Thus, connectivity to display data communication lines and power planes of the adaptable graphics board may be altered to the I/O components of a reconfigurable I/O module board in either the first or second orientations via the dual compression connector 975 in various embodiments.

The dual compression connector 975 may also include alignment guides 916 in an embodiment to assist in ease of placement and orientation between an adaptable graphics board and reconfigurable I/O module board. Alignment guides 916 may be used on either the first side to align the first array of contacts 961, on the second side to align the second array of contacts 971, or on both sides. In some embodiments, alignment guides 916 are alignment posts that may fit into holes or alignment guide receivers in the adaptable graphics board and the reconfigurable I/O module board to align both with the dual compression connector 975. In other embodiments, either or both of the first or second sides of the dual compression connector 975 may have alignment guide receivers to fit with alignment guides, such as posts, from either the adaptable graphics board or the reconfigurable I/O module board. Various other alignment structures may be utilized as understood in the art.

Figure 10A:
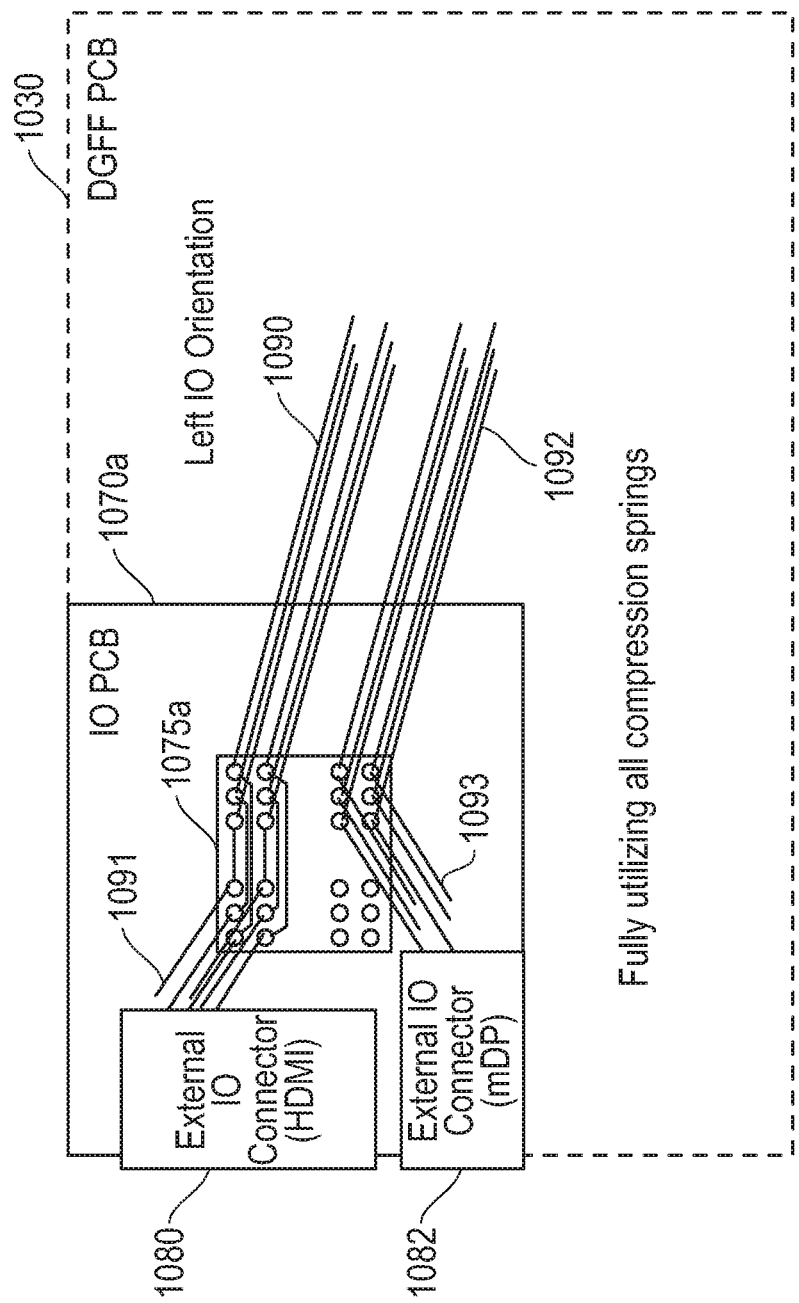
FIG. 10A is a block diagram showing an adaptable graphics board and reconfigurable I/O module board with external I/O connectors in a first orientation according to an embodiment of the present disclosure.

FIG. 10A shows a block diagram of an adaptable graphics board 1030 with a reconfigurable I/O module board 1070a mounted in a first orientation according to an embodiment of the present disclosure on a left corner of the adaptable graphics board 1030 such that the reconfigurable I/O module board 1070a has a left I/O orientation according to one embodiment of the disclosure. In the shown embodiment, the external I/O ports 1080 and the external I/O port 1082 are aligned on a left side edge of the adaptable graphics board 1030. A dual compression connector 1075a is shown in the first orientation providing operative coupling for data connectivity and power from the main portion of the adaptable graphics board 1030. In a first aspect, display data lines and power 1090, for example in the form of PCB traces and power planes, are operatively coupled to a first subset plurality of electrical contacts at a reconfigurable I/O module interface on the adaptable graphics board. The display data lines and power 1090 connect from the set of core components such as the GPU to provide for data and power lanes to an external I/O connector 1080. Those display data lines and power 1090 are in contact with a first side of the dual compression connector 1075a in the first orientation and a first subset of contacts in the array of contacts on the first side of 1075a. The contacts on the first side of dual compression connector 1075a are linked to a second subset of contacts which are further linked on to the second side as depicted via a PCB layer disposed between the first and second side of 1075a. The additional second side contacts of the dual compression connector are operatively coupled to data and power lines 1091 in the reconfigurable I/O module board PCB 1070a. The data and power line traces 1091 in the reconfigurable I/O module board 1070a are coupled through the PCB of 1070a to the external I/O port 1080. In the shown example embodiment, an HDMI external I/O connector is shown at 1080.

A second set display data lines and power 1092, for example in the form of PCB traces and power planes in the adaptable graphics board, are operatively coupled to a second subset plurality of electrical contacts at a reconfigurable I/O module interface on the adaptable graphics board. The display data lines and power 1092 connect from the set of core components, such as the GPU, to provide for data and power lanes to a second external I/O connector 1082. Those display data lines and power 1092 are in contact with a first side of the dual compression connector 1075a at a third subset of contacts in the array of contacts on the first side via the reconfigurable I/O module interface. The third subset of contacts on the first side of dual compression connector 1075a are linked to contacts on the second side via a pass-through of the PCB layer of 1075a as depicted. The additional second side contacts of the dual compression connector are operatively coupled to data and power lines 1093 in the reconfigurable I/O module board PCB 1070a. The data and power line traces 1093 in the reconfigurable I/O module board 1070a are coupled through the PCB to the external I/O port 1082. In the shown example embodiment, an mDP external I/O connector is shown at 1082.

Figure 10B:
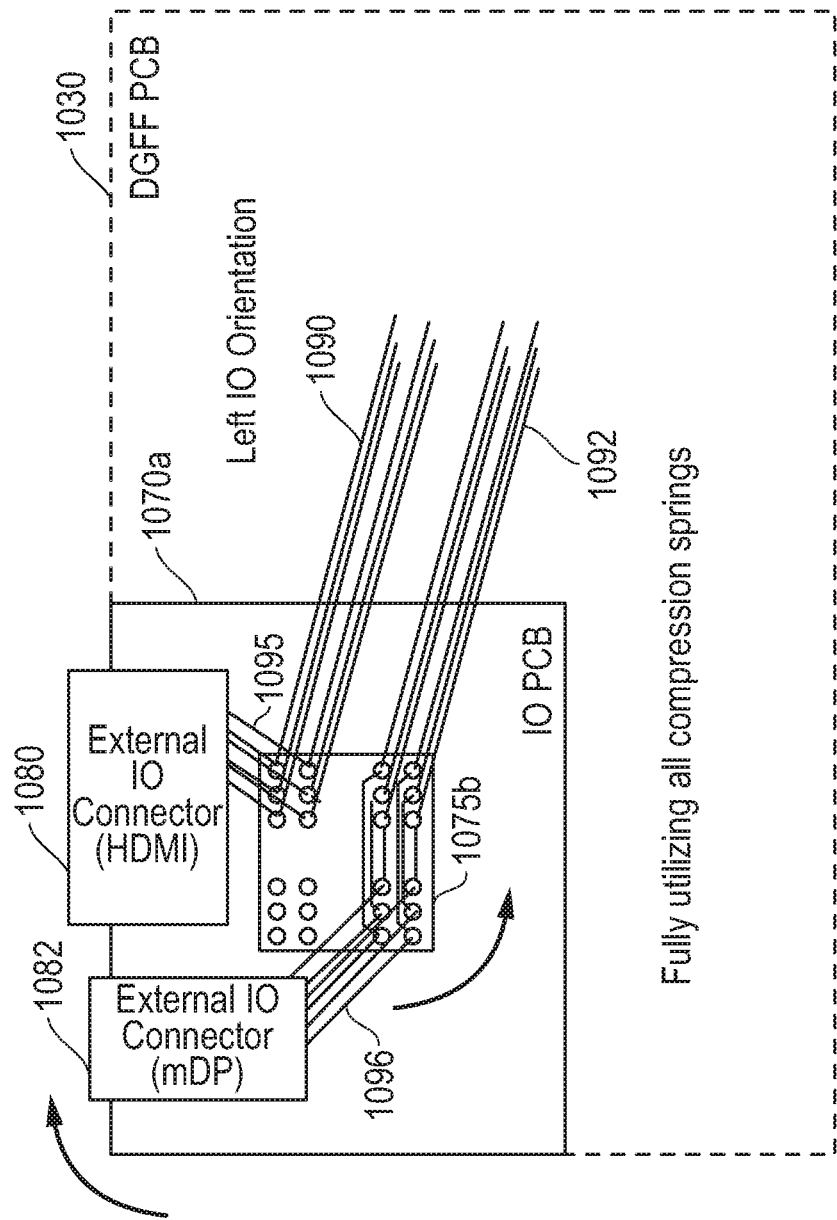
FIG. 10B is a block diagram showing an adaptable graphics board and reconfigurable I/O module board with external I/O connectors in a second orientation according to another embodiment of the present disclosure.

FIG. 10B shows a block diagram of an adaptable graphics board 1030 with a reconfigurable I/O module board 1070b mounted in a second orientation according to an embodiment of the present disclosure at a left corner of the adaptable graphics board 1030 in a left I/O orientation. In the shown embodiment, the external I/O ports for HDMI 1080 and the external I/O port for mDP 1082 are aligned on a top edge of the adaptable graphics board 1030. The reconfigurable I/O module board 1070b has been rotated 90° relative to 1070a as shown in FIG. 10A. A dual compression connector 1075b is shown in the second orientation providing operative coupling for data connectivity and power from the main portion of the adaptable graphics board 1030. In this second orientation, dual compression connector 1075b is rotated 180° relative to 1075a in FIG. 10A. This is done to provide for connectivity among contacts for data and power to supply the external I/O display data ports 1080 and 1082.

In a first aspect, display data lines and power 1090, for example in the form of PCB traces and power planes in the adaptable graphics board 1030, are operatively coupled to a first subset plurality of electrical contacts at a reconfigurable I/O module interface on the adaptable graphics board. The display data lines and power 1090 connect from the set of core components such as the GPU and provide data and power lanes to an external I/O connector 1080. Those display data lines and power 1090 are in contact with a first side of the dual compression connector 1075b in the second orientation. The display data lines and power 1090 are operatively coupled to a fourth subset of contacts in the array of contacts on the first side 1075b. The fourth subset of contacts on the first side of dual compression connector 1075b are linked as pass through to contacts on the second side of the dual compression connector 1075b as depicted.

The pass through to the second side contacts of the dual compression connector via the fourth subset of contacts are operatively coupled to data and power lines 1091 in the reconfigurable I/O module board PCB 1070*b* in the second orientation. The data and power line traces 1091 in the reconfigurable I/O module board 1070*b* orientation are still coupled through the PCB to the external I/O port 1080. In the shown example embodiment, an HDMI external I/O connector is shown at 1080.

A second set display data lines and power 1092, for example in the form of PCB traces and power planes in the adaptable graphics board, are operatively coupled to the second subset plurality of electrical contacts at a reconfigurable I/O module interface on the adaptable graphics board. The display data lines and power 1092 connect from the set of core components such as the GPU to provide for data and power lanes to a second external I/O connector 1082. Those display data lines and power 1092 are in contact with a first side of the dual compression connector 1075*b* at a first subset of contacts in the array of contacts on the first side of the dual compression connector 1075*b*. The second subset of contacts on the first side of dual compression connector 1075*b* are linked to the first subset of contacts as depicted in an embodiment. The first subset of contacts are linked to the second side as depicted through a PCB layer between the first and second side in an example embodiment. Other connections through the central PCB layer of 1075*b* may be implements as understood as well. The additional second side contacts of the dual compression connector are operatively coupled to data and power lines 1093 in the reconfigurable I/O module board PCB 1070*b* in the second orientation. The data and power line traces 1093 in the reconfigurable I/O module board 1070*a* are coupled through the PCB to the external I/O port 1082. In the shown example embodiment, an mDP external I/O connector is shown at 1082.

Pursuant the above example embodiment, the same reconfigurable I/O module board may be used in two orientations 1070*a* and 1070*b* along with the same design for a dual compression connector in two orientations 1075*a* and 1075*b* to achieve mechanical and electrical operative coupling between the reconfigurable I/O module board and an adaptable graphic board 1030. With the above example embodiment, external I/O display data ports may be rotated between two edges of the adaptable graphics board by merely changing orientation of the reconfigurable I/O module board from 1070*a* to 1070*b* or vice-versa. To achieve electrical operative coupling, the dual compression connector need only be rotated between 1075*a* and 1075*b* before applying a clamping mechanism to compress the dual compression connectors. It is appreciated that other sides and rotations may be utilized with the same or similar reconfigurable I/O module boards and dual compression connectors. In some example embodiments, the connectivity through the dual compression connector may only require a 90° rotation or may require rotation in a different direction. In yet other embodiments, flipping the first and second sides of the dual compression connector may achieve electrical operative coupling when reconfigurable I/O module board needs to be rotated from 1070*a* to 1070*b* or vice-versa. It may be appreciated that subsets of arrays of connectors on the first or second sides of the dual compression connector may be connected in a variety of formats through the PCB layer between the first and second sides to achieve reconfigurability with rotation of reconfigurable I/O module boards from 1070*a* to 1070*b* or vice-versa.

The above descriptions are only meant as an exemplary embodiment of the reconfigurable I/O module board being re-oriented in combination with re-orientation options for a dual compression connector to achieve reconfigurable electrical data and power coupling without requiring redesign of the adaptable graphics board main portion 1030 in various embodiments. Further, a reconfigurable I/O module board may not need to be redesigned in some embodiments and may merely be rotated to desired positions of external I/O components 1080 and 1082 in other embodiments as described in examples above and variations to the same. Additionally, a dual compression connector may be designed to be reorientable in coordination with the reconfigurable I/O module board change in rotation to provide for electrical data and power coupling with the main portion of the adaptable graphics board 1030 in yet other embodiments. It is appreciated that connectivity between the first and second sides of a dual compression connector may be made through the middle PCB layer of 1075*a* or 1075*b* in any variety of configurations in embodiments contemplated herein.

In yet other embodiments, rotation of reconfigurable I/O module board from 1070*a* to 1070*b* or vice-versa may not be necessary and use of different reconfigurable I/O module boards in arrangements similar to 1070*a* and 1070*b* may be used depending on the orientation desired. As another embodiment, different dual compression connector designs may be used between a first or second orientation in some embodiments requiring only rotation of the reconfigurable I/O module board from 1070*a* to 1070*b* or vice-versa and use of the appropriate dual compression connector for either rotation option. Even in these embodiments, a great deal of savings may be achieved by reuse of the set of core component layout design of the main portion of the adaptable graphics board 1030. Further, it is understood that arrays of contacts may be compressible electrical contacts deployed on a variety of surfaces in the above embodiments including on the first and second sides of the dual compression connector, on the reconfigurable I/O module board, or on the main portion of the adaptable graphics board 1030.

Figure 11:
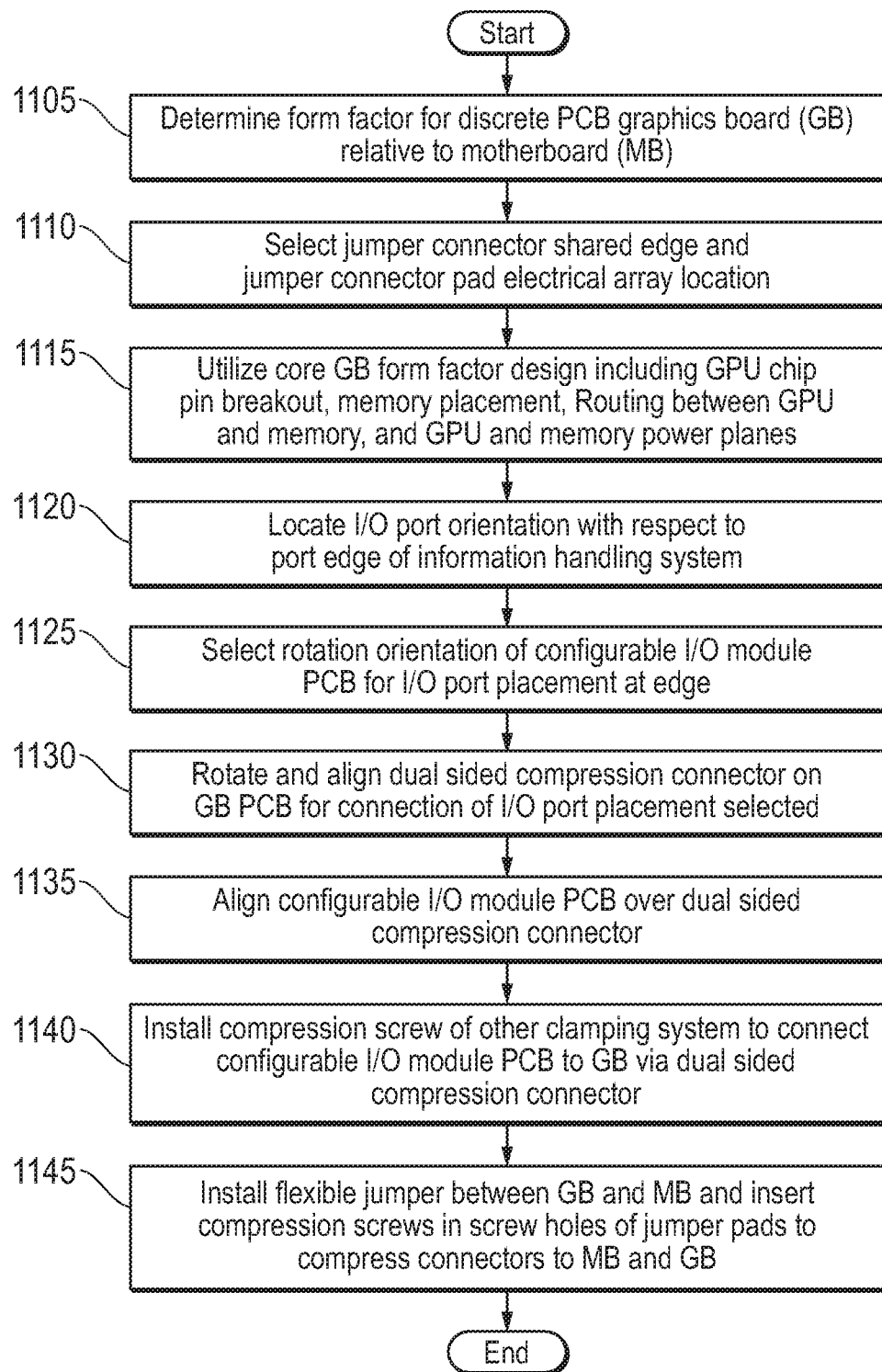
FIG. 11 is a flow diagram illustrating method of assembly with an adaptable graphics board with a reconfigurable I/O module board according to an embodiment of the present disclosure.

FIG. 11 shows a method of selecting an adaptable graphics board and assembling with a motherboard in an information handling system operatively coupled with one or more flexible compression jumper connectors according to an embodiment of the present disclosure. At 1105, a selection must be made of a first model specification for an information handling system chassis layout from among a plurality of model specifications with which the adaptable graphics form factor may be implemented according to embodiments herein. Selection of the chassis layout with respect to graphics board and motherboard locations may be specified for the selected first model specification.

Proceeding to 1110, the shared edge across which one or more flexible compression jumper connectors may span between corresponding connector pad interfaces on the main portion of the adaptable graphics board and the motherboard may be identified in the first model specification. The adaptable graphics board will require a selected connector pad interface area along the edge of the adaptable graphics board shared with the motherboard. The contact arrays of the connector pad interfaces will be located in the connector pad interface area of the adaptable graphics board. The connector pad interface is for receiving a jumper connector pad for one or more flexible compression jumper connectors.

At 1115, the set of core components may be utilized from the main portion of the adaptable graphics board which is a form factor and may include the remainder of graphics board layout with a set of core components. The set of core components will involve more complicated and difficult design elements of the components on a graphic board in some embodiments. The set of core components may be utilized with a plurality of model specifications of information handling system. Modification of the adaptable graphics board may then be needed only of a reconfigurable I/O module board operatively coupled to the main portion of the adaptable graphics board in one of a plurality of orientations.

The set of core components includes a GPU and a space for a GPU mount as well as a plurality of graphics memory chips in some embodiments. The set of core components may also include the GPU and memory locations, the GPU chip pin breakout in the PCB, the memory pin breakout, routing between the GPU and graphics memory, power planes under the GPU and memory to support their operation, and bus connectivity interface link to other parts of the information handling system including PCIe, DisplayPort, or other display data bus connectivity. The set of core components implemented in the main portion of the adaptable graphics board may also include one or more connector pad interface areas with a plurality of connector pad interfaces along an edge to be shared with the motherboard. Since the set of core components represent several aspects of the adaptable graphics board layout with implementation that is more complicated, flexibility to re-use this portion of the main portion of the adaptable graphics board for a plurality of model specification chassis arrangements will improve efficiency and costs of PCB production and assembly.

Selection of the first model specification will also indicate a location for external display data port components on the reconfigurable I/O module board and along a choice of edges of the adaptable graphics board at 1120 in some embodiments. For example, the location of the external display data ports for a first model specification, such as DisplayPort, HDMI, USB, or other display data communication port components, may be identified on the adaptable graphics board. The external display data ports or connector hardware components will be located to align with the external locations along an edge or back of the information handling system chassis for the selected first model specification in an example embodiment.

The adaptable graphics board will also be provided for flexibility to utilize the reconfigurable I/O module board to easily interface with the established set of core components via a dual compression connector at a reconfigurable I/O module board interface area. The set of core components for the adaptable graphics board will include reconfigurable I/O module board interface area to interface with the reconfigurable I/O module board. The reconfigurable I/O module board interface may include an array of contacts including one or more communication and power interface contacts to couple with the reconfigurable I/O module board and its components.

At 1125, the overall rotation of the reconfigurable I/O module board may utilize placement of the external display port socket locations on an edge of the adaptable graphics board to determine the orientation of the reconfigurable I/O module board with respect to the main portion of the adaptable graphics board. The rotation of the reconfigurable I/O module board may provide for communication and power coupling from the main portion of the adaptable graphics board to the external I/O display data port components and their intended location along a side of the chassis of the information handling system. In an example embodiment, the adaptable graphics board design may be flexible in selection among a plurality of orientations for the reconfigurable I/O module board for placement and location of external display data port socket hardware on the adaptable graphics board.

At 1130, the dual compression connector may be used to operatively couple the reconfigurable I/O module board and the interface area on the main portion of the adaptable graphics board. The dual compression connector may have a first side and a second side with arrays of contacts on each side which are operatively coupled to provide electrical communication coupling between the first and second sides. The arrays of contacts may be compressible electrical spring contacts in various embodiments to permit compression electrical contact with the reconfigurable I/O module board or the adaptable graphics board in some embodiments herein. In other embodiments, the compressible electrical spring contacts may be mounted on the reconfigurable I/O module board or the adaptable graphics board.

Selection of the rotation of the dual compression connector may be made to provide for corresponding coupling between data and power lanes in the main portion PCB of the adaptable graphics board and external I/O display data ports on the reconfigurable I/O module board in accordance with various embodiments herein. Alignment guides may be used on the dual compression connector to align with alignment guide receivers on the main portion of the adaptable graphics board around the reconfigurable I/O module board interface in embodiments. In other embodiments, the alignment guides may be mounted on the adaptable graphics board for alignment on alignment guide receivers on the dual compression connector. As described in embodiments herein, the dual compression connector may be rotatable such that it may accommodate a plurality of orientations of the reconfigurable I/O module board to set the external display data ports along a plurality of edges. In other embodiments, a different dual compression connector may be selected to accommodate the rotation of the reconfigurable I/O module board and its external display data ports at 1130. In yet other embodiments, different reconfigurable I/O module board design with contacts connecting to different placement of the external display data ports may be selected at 1130 to achieve a different orientation and location of external display data ports along a different edge of the adaptable graphics board.

Proceeding to 1135, alignment guides may be used on the dual compression connector to align with alignment guide receivers on the reconfigurable I/O module board in embodiments. In this way the reconfigurable I/O module board may be aligned on the dual compression connector. In other embodiments, the alignment guides may be mounted on the reconfigurable I/O module board for alignment on alignment guide receivers on the dual compression connector. As described in embodiments herein, the reconfigurable I/O module board will be rotated and aligned to operatively couple with the dual compression connector rotated or selected to provide electrical coupling for data between the main portion of the adaptable graphics board and the set the external display data ports along a plurality of edges.

At 1140, compression screws or another clamping mechanism may be utilized to compress compressible electrical contact arrays of the dual compression connector disposed between the reconfigurable I/O module board and the reconfigurable I/O module board interface area of the main portion of the adaptable graphics board. For example, compression screws may be disposed through holes in the reconfigurable I/O module board and the dual compression connector to receivers on, in, or behind the main portion adaptable graphics board. For example, a compression screw may be threaded into a compression screw receiver in the adaptable graphic board or a compression nut mounted thereon.

At 1145, the motherboard and adaptable graphics board may be operably coupled with one or more flexible compression jumper connectors according to various embodiments herein. Compression screws or another clamping mechanism may be utilized to compress compressible electrical contact arrays of each flexible compression jumper connector to a connector pad interface area of the adaptable graphics board or the motherboard. For example, compression screws may be disposed through holes in the compression jumper pads to receivers on the respective adaptable graphics board or motherboard.

The motherboard and the adaptable graphics board may be arranged with respect to one another in the chassis of the selected first model specification. Adjacent orientation of the adaptable graphics board to the motherboard may be used to reduce the height or z-space occupied by both PCB boards with the information handling system. This may assist in reducing the thickness of the information handling system. Stacking orientation may be used to reduce the planar length or width area occupied by the PCB boards in the chassis in other embodiments.

As described with other embodiments, adjustment of levels of the tops at least one CPU and the top at least one GPU may be better aligned with respect to a heat pipe by adjusting the flexible compression jumper connector or connectors between the motherboard and the graphics board thus reducing complexity of heat pipe implementation. In other aspects, alignment of the motherboard and graphics board may be adjusted with the flexible transition provided by the compression jumper connector or connectors to accommodate alignment with other information handling system components, such as external display data ports, within the chassis of the first model specification. At this point the process may end. It is appreciated that the process described with respect to FIG. 11 may be utilized for any selected model specification from among a plurality of model specifications of information handling system products. In this way, the adaptable graphics board form factor may be utilized with reduced modification needed and applied to a wide variety of chassis layouts including a variety of motherboard designs for several product models. Such a feature is beneficial to costs and time of development of graphics boards for use with model specification assemblies of a wider variety of information handling system models and improving overall design efficiencies.

The depictions in FIGS. 3A-3E, FIG. 4, FIG. 5A, FIG. 5B, FIGS. 6A-6C, and FIGS. 8A-8D are meant for illustration and do not necessarily represent accurate sizes or relationships between aspects of the flexible compression jumper connectors depicted, the motherboards, graphics boards, components, or the information handling system depicted therein. It may also be appreciated that variations on the configurations are also contemplated including location and alignments of motherboard, graphics boards, components thereon. For example, location of compressible communication contacts may be on the compression pads of the flexible compression jumper connectors or the motherboard or adaptable graphics boards. Similarly, the location of compressible communication contacts may be on the adaptable graphics board or the reconfigurable I/O module board instead of one or both sides of the dual compression connector. Other variations of the embodiments are contemplated.

It is understood that the structures and concepts described in the embodiments above for FIGS. 1-6C and 8A-10B may be constructed using a variety of the components. For example, the compressible spring contact structures may be any of or a combination of deflectable wires, springs, strips, or other structures understood in the art to apply a counter force when compressed to make mechanical and electrical contact with a corresponding electrical contact compressed into the compressible spring contact. It is also understood that for the methods in FIGS. 7 and 11 some steps may be omitted, additional steps may be performed, or steps may not be performed in the order depicted according to variations of the embodiments as understood by those of skill. In particular, for embodiments of the figures disclosed herein, some varied embodiments may utilize certain components or techniques which may also be combined with portions of any other embodiments in the present disclosure to form a variety of additional embodiments from aspects of those embodiments described herein.

In some embodiments, dedicated hardware implementations such as application specific integrated circuits, programmable logic arrays and other hardware devices can be constructed to implement one or more of the internal components described herein or portions of one or more of the internal components described herein. Applications that may include the apparatus and systems of various embodiments can broadly include a variety of electronic and computer systems. One or more embodiments described herein may implement functions using two or more specific interconnected hardware structures to provide a simplified access to internal components of a mobile information handling system while maintaining a unibody appearance between the display screen and the chassis.

In accordance with various embodiments of the present disclosure, the compressive force structures described are understood by those of skill in the art to be a structure when placed between to objects and subject to compressive stress responds with a counterforce against that compressive stress. Example specific structures such as compressive pads, foam, springs, bladders, or shape memory devices that return to an original shape after stress of compression is release and described herein may be implemented by numerous embodiments described.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries. Further, devices, structures or other aspects of the mobile information handling systems described or shown as coupled or connected to one another or applying force to one another may be connected or coupled in all cases through one or more additional intermediary structures or devices or some structures and devices may not be needed or intermediary as shown or described. Several example embodiments are described where such a coupling or connection of structures may exist.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An adaptable graphics board comprising: the adaptable graphics board including a graphics processor, graphics memory, and a reconfigurable I/O module interface are having a plurality of electrical contacts; a dual compression connector having a first array of compressible electrical spring contacts on a first side and a second array of compressible electrical spring contacts on a second side operatively coupled to the first side via a dual compression connector printed circuit board layer; the first side of the dual compression connector operatively coupled to the reconfigurable I/O module interface of the adaptable graphics board; a reconfigurable I/O module board having external display data ports disposed along an edge, wherein the reconfigurable I/O module board is operatively coupled to the adaptable graphics board via the second side of the dual compression connector; the dual compression connector oriented between the adaptable graphics board and the reconfigurable I/O module board in a first orientation and a second orientation selected from a plurality of available orientations to operatively provide I/O connectivity between the graphics processor and the external display data ports aligned along a first edge and a second edge of the adaptable graphics board respectively.

2. The adaptable graphics board of claim 1 wherein the reconfigurable I/O module board external display data ports interface with a chassis side for mounting external display data ports along a first edge of the adaptable graphics board according to a first model specification of an information handling system.

3. The adaptable graphics board of claim 1 wherein the dual compression connector printed circuit board layer may operatively couple a first subset of compressible electrical spring contacts on the first side to a second subset of compressible electrical springs on the second side to operatively couple to external display data ports of the reconfigurable I/O module board to the adaptable graphics board in the first orientation.

4. The adaptable graphics board of claim 1, further comprising:
the dual compression connector oriented between the adaptable graphics board and the reconfigurable I/O module board in a second orientation selected from the plurality of available orientations to provide I/O connectivity between the graphics processor and the external display data ports aligned along a second edge of the adaptable graphics board.

5. The adaptable graphics board of claim 4 wherein the second orientation of the dual compression connector is rotated relative to the first orientation to engage a new subset of compressible electrical spring contacts with the reconfigurable I/O module interface and the reconfigurable I/O module board is rotated to align at least one external display data port along the second edge of the adaptable graphics board and operatively couple the at least one external display data port to the new subset of compressible electrical spring contacts.

6. The adaptable graphics board of claim 4 wherein the reconfigurable I/O module board external display data ports interface with a chassis side for mounting external display data ports according to a second model specification of an information handling system.

7. The adaptable graphics board of claim 1 wherein the adaptable graphics board further comprises a graphics processor connector lines and data routing between the graphics processor and graphics memory, and lines for power planes supplying the graphics processor and graphics memory that may be used with the plurality of orientations of the dual compression connector and reconfigurable I/O module board.

8. The adaptable graphics board of claim 1, further comprising:
a compression screw disposed through the reconfigurable I/O module board and dual compression connector to a compression screw receiver mounted on, in, or behind the adaptable graphics board to compress the first array of compressible electrical spring contacts on the first side and a second array of compressible electrical spring contacts on second side of the dual compression connector to operatively couple the reconfigurable I/O module board to the adaptable graphics board.

* * * * *